(12) United States Patent
Rolf

(10) Patent No.: US 7,376,583 B1
(45) Date of Patent: May 20, 2008

(54) DEVICE FOR MAKING A TRANSACTION VIA A COMMUNICATIONS LINK

(75) Inventor: Devon A. Rolf, Kansas City, MO (US)

(73) Assignee: GoFigure, L.L.C., Paola, KS (US)

( * ) Notice: Subject to any disclaimer, the term of this patent is extended or adjusted under 35 U.S.C. 154(b) by 433 days.

(21) Appl. No.: 09/635,935

(22) Filed: Aug. 10, 2000

Related U.S. Application Data

(60) Provisional application No. 60/147,987, filed on Aug. 10, 1999.

(51) Int. Cl.
*G06Q 20/00* (2006.01)

(52) U.S. Cl. ........................................ 705/17

(58) Field of Classification Search .................... 705/1, 705/18, 16, 17; 379/88.17, 93.07
See application file for complete search history.

(56) References Cited

U.S. PATENT DOCUMENTS

| | | |
|---|---|---|
| 3,652,795 A | 3/1972 | Wolf et al. |
| 3,906,460 A | 9/1975 | Halpem |
| 3,971,916 A | 7/1976 | Moreno |
| 4,004,133 A | 1/1977 | Hannan et al. |
| 4,053,735 A | 10/1977 | Foudos |
| 4,092,524 A | 5/1978 | Moreno |
| 4,211,919 A | 7/1980 | Ugon |
| 4,277,837 A | 7/1981 | Stuckert |
| 4,298,793 A | 11/1981 | Melis et al. |
| 4,341,951 A | 7/1982 | Benton ........................ 235/379 |
| 4,454,414 A | 6/1984 | Benton |
| 4,460,965 A | 7/1984 | Trehn et al. |
| 4,482,802 A | 11/1984 | Aizawa et al. |
| 4,498,000 A | 2/1985 | Decavaele et al. |
| 4,536,647 A | 8/1985 | Atalla et al. |
| 4,575,621 A | 3/1986 | Dreifus |
| 4,634,845 A | 1/1987 | Hale et al. |
| 4,689,478 A | 8/1987 | Hale et al. |
| 5,025,373 A | 6/1991 | Keyser, Jr. et al. .......... 364/408 |
| 5,157,717 A | 10/1992 | Hitchcock ..................... 379/96 |
| 5,179,373 A | 1/1993 | John ..................... 340/825.15 |
| 5,221,838 A | 6/1993 | Gutman et al. .............. 235/379 |
| 5,276,311 A | 1/1994 | Henige |
| 5,383,113 A | 1/1995 | Kight et al. ................. 364/401 |
| 5,465,291 A * | 11/1995 | Barrus et al. ............... 379/67.1 |
| 5,469,497 A | 11/1995 | Pierce et al. ................. 379/115 |
| 5,657,373 A | 8/1997 | Hermansson et al. ........ 455/435 |
| 5,719,918 A * | 2/1998 | Serbetciougin et al. ....... 379/58 |

(Continued)

FOREIGN PATENT DOCUMENTS

| | | |
|---|---|---|
| GB | 2066540 A | 7/1981 |

(Continued)

OTHER PUBLICATIONS

U.S. Appl. No. 60/136,642.*

(Continued)

*Primary Examiner*—Ronald Laneau

(57) ABSTRACT

A wireless communications device has a transponder for transmitting information for making a transaction to a point of sale terminal. When the device is within the range of a field generated by the point of sale terminal, the transponder is excited and transmits the information to the point of sale terminal. The wireless communications device also includes a cellular transmitter for use in making a purchase transaction.

58 Claims, 9 Drawing Sheets

U.S. PATENT DOCUMENTS

| | | | |
|---|---|---|---|
| 5,739,511 A | 4/1998 | Pedersen | 235/380 |
| 5,739,512 A * | 4/1998 | Tognazzini | 235/380 |
| 5,789,733 A | 8/1998 | Jachimowicz et al. | |
| 5,796,832 A | 8/1998 | Kawan | 380/24 |
| 5,857,156 A * | 1/1999 | Anderson | 455/517 |
| 5,887,266 A | 3/1999 | Heinonen et al. | 455/558 |
| 5,890,052 A | 3/1999 | Read et al. | 455/90 |
| 5,943,624 A | 8/1999 | Fox et al. | 455/556 |
| 5,969,968 A | 10/1999 | Pentel | |
| 5,983,094 A | 11/1999 | Altschul et al. | 455/413 |
| 5,991,749 A * | 11/1999 | Morrill, Jr. | 705/44 |
| 5,993,047 A | 11/1999 | Novogrod et al. | 364/479.01 |
| 5,999,807 A | 12/1999 | Kaplan et al. | 455/411 |
| 6,015,092 A | 1/2000 | Postlewaite et al. | 235/486 |
| 6,016,476 A * | 1/2000 | Maes et al. | 705/1 |
| 6,039,247 A * | 3/2000 | Reccia et al. | 235/379 |
| 6,119,946 A * | 9/2000 | Teicher | 235/492 |
| 6,121,544 A * | 9/2000 | Petsinger | 174/35 R |
| 6,144,848 A | 11/2000 | Walsh | |
| 6,170,745 B1 * | 1/2001 | Schilling | 235/382.5 |
| 6,339,638 B1 * | 1/2002 | Ohki et al. | 379/91.01 |
| 6,394,343 B1 * | 5/2002 | Berg et al. | 235/379 |
| 6,434,159 B1 * | 8/2002 | Woodward et al. | 370/401 |
| 6,434,403 B1 * | 8/2002 | Ausems et al. | 455/556 |
| 6,435,406 B1 * | 8/2002 | Pentel | 235/380 |
| 6,502,748 B2 * | 1/2003 | Berg et al. | 235/379 |
| 6,533,168 B1 * | 3/2003 | Ching | 235/375 |
| 6,664,922 B1 | 12/2003 | Fan | |
| 7,089,208 B1 | 8/2006 | Levchin et al. | 705/39 |
| 2002/0128980 A1 * | 9/2002 | Ludtke et al. | 705/67 |
| 2002/0181710 A1 * | 12/2002 | Adam et al. | 380/270 |
| 2006/0129504 A1 * | 6/2006 | Nakajima | 705/75 |

FOREIGN PATENT DOCUMENTS

| | | |
|---|---|---|
| WO | PCT/SE83/00062 | 9/1983 |
| WO | WO 99/00773 A1 * | 1/1999 |
| WO | WO 99/33034 A1 * | 7/1999 |
| WO | WO 0079771 A1 * | 12/2000 |

OTHER PUBLICATIONS

U.S. Appl. No. 60/020,312 (not readily available).*
75-633127, Jadlow Communications Company, LLC, Trademark File History, obtained Dec. 22, 2003.*
Bluetooth, 75643769, TESS Printout, Jan. 5, 2003.*
Bluetooth, 76054633, Tess printout, Jan. 5, 2003.*
Wi-Fi, 2525795, Tess printout, Dec. 29, 2003.*
Wireless Ethernet Compatibility Alliance (WECA) Announces Independent Test Lab and Wi-Fi Technology Brand, Press Release, Sep. 15, 1999.*
Greg Groeller, Gee Whiz Features Aren't So Remote, Orlando Sentinel, May 2, 1999, p. H1.*
MC Revett and G J South, Consumer Devices for eCommerce Access, BT Technology Journal, vol. 17, No. 3, Jul. 1999, pp. 112-123.*
Tiri News, Texas instruments, Issue No. 18, 1998, pp. 1-12.*

* cited by examiner

DEVICE FOR MAKING A TRANSACTION VIA A COMMUNICATIONS LINK

CROSS-REFERENCE TO RELATED APPLICATIONS

Pursuant to 35 U.S.C.§119(e), priority benefits are claimed herein from now abandoned provisional application Ser. No. 60/147,987, filed on Aug. 10, 1999, entitled "A Device, System, and Method for Making Transactions Via a Communications Link".

BACKGROUND OF THE INVENTION

1. Field of the Invention

The present invention is directed to a system, method and device for performing transactions, such as financial transactions, via a communications link. More particularly, the present invention is directed to a system, method and device for performing financial transactions, such as sales transactions at a point of sale terminal, via a wireless communications link. Still more specifically, the present invention is directed to utilization of a hand held electronic device, such as a cellular telephone, a pager, or a hand held personal computer, for performing financial transactions and, particularly, sales transactions via a wireless communications link.

2. Description of the Related Art

The popularity of cashless transactions is widespread. In this regard, a substantial quantity of transactions are made everyday by consumers utilizing credit or debit cards. As is known, these cards typically employ a magnetic strip having data indicative of the account holder and corresponding account thereon. The cards are passed through a reader connected to a point of sale terminal, and an appropriate number of monetary units corresponding to the transaction being made are either credited to, or debited from, the account corresponding to the card.

More recently, "Smart Cards" have been proposed, and have gained some popularity. Unlike conventional debit and credit cards, which are typically passive devices, Smart Cards are stored-value products in that the card maintains a "stored value" of funds available to the consumer for access primarily at retail locations. The "stored value" is typically stored on a computer chip within the card, or possibly on a magnetic strip. The card is considered "smart", because the stored value may be added to, such as at an automatic teller machine, and may be subtracted from, such as the case when a balance recorded on the card is debited at a merchant's POS terminal when the consumer makes a purchase.

The most sophisticated systems currently available permit consumers to store substantial amounts of "e-cash" on the card. Some Smart Cards allow the consumer to obtain additional cash from ATMs in addition to making purchases. Some also have a feature by which the consumer can "load up" by accessing a line of credit. Depending upon the type of Smart Card utilized, one purported advantage of Smart Cards is that they can operate like cash in that there is no requirement for accessing a central facility, storing and retrieving data from the central facility, or storing a record to the central facility.

While each of the foregoing types of electronic cash, debit, and credit products are useful for their intended purposes, each has drawbacks. For instance, credit, debit, and Smart Cards are issued by a particular financial institution or a vendor. While the cards may be utilized at a wide variety of merchant locations, the consumer has no choice of which account he or she wishes to correspond with a transaction, unless the consumer has multiple such cards. Additionally, each of the foregoing types of cards is limited to its particular purpose, and is not usable for any other function.

In addition to the widespread and increasing popularity of various types of bank cards and Smart cards, the proliferation of wireless communication devices has been widespread in recent years. In this regard, cellular telephones, pagers, and hand or palm held personal computers have gained widespread popularity. The devices are useful not only for transmitting and receiving voice and data, but also for storing information, such as addresses, telephone numbers, etc. depending upon the particular features and function of the device. In short, however, the number of users and the volume of use of such products is substantial and growing rapidly.

In spite of the widespread use and popularity of cellular telephones, pagers, and hand held computers, these products have not previously been used for making financial transactions and, particularly, for transacting sales at merchants point of sale terminals. In this regard, conventional point of sale terminals are not equipped to communicate with a wireless communication device. There have been some attempts at combining Smart Cards and Smart Card readers with wireless communication devices. For example, U.S. Pat. No. 5,890,052 is directed to a portable wireless telephone structure in which a foldable wallet carries a telephone, in addition to having a pocket to house paper currency. The telephone may be utilized to transfer money from a bank account to the Smart Card. Thus, according to the patent, apart from storage of bank notes as required by the user, the only additional bulk required with the structure is a single Smart Card for use with the telephone for transaction purposes. U.S. Pat. No. 5,796,832 is directed to a wireless transaction information system which permits a wireless or cellular telephone hook up to a financial institution. A particular feature of the invention is that a "Smart Card" is utilized to verify authorization for banking transactions, or to maintain a secure record of available funds.

The inventions disclosed in the foregoing patents have not gained widespread popularity, primarily due to the fact that Smart Cards themselves have not gained overwhelming popularity. Moreover, neither patent provides a user the ability to perform sales transactions at a point of sale terminal using a wireless communication device.

Even more recently, proposals have been made to include Internet browser software in cellular telephones, for allowing a user of a cellular telephone device to browse the Internet via a wireless communications link. These proposals, however, are directed at permitting the user of a cellular telephone to browse the Internet for information, but do not address the need to make financial transactions utilizing the cellular telephone. Other recent proposals involve using a cellular telephone to remotely control home appliances in so-called "smart" houses. Again, these proposals do not address using the cellular telephone to make sales transactions.

Accordingly, in view of the overwhelming popularity of electronic transactions and wireless communication devices, the need exists for a method, system and device for performing sales transactions at a point of sale terminal via a wireless link from a wireless communication device, such as a cellular telephone, pager, or hand held personal computer. The present invention fills these and other needs, while overcoming the drawbacks of the prior art.

SUMMARY OF THE INVENTION

It is an object of the present invention to simplify sales transactions.

It is an object of the present invention to expand the usable application for conventional wireless communication devices, such as cellular telephones, pagers, and hand held personal computers.

It is an additional object of the present invention to provide a wireless communications device, a method, and a system for performing sales transactions at a point of sale terminal.

These and other objects are achieved by a wireless communications device, such as a cellular telephone, pager, or hand held personal computer, which links with, or is at a minimum electronically associated with, a point of sale terminal for transacting a sale. In the various embodiments of the present invention, the wireless communication device communicates with the point of sale terminal either directly via a communications network or through a central processing facility (which in turn communicates with the point of sale terminal) for processing of a financial sales transaction, or communicates with a central processing facility which is also in data communication with a point of sale terminal at which a transaction is being made.

In one embodiment, a remote central processing facility is provided. A wireless communication link is established between the communications device and the point of sale terminal, and the point of sale terminal then communicates with the central processing facility. According to one aspect of the invention, the communications device transmits data, to the point of sale terminal, indicative of the identity of the communications device and also indicative of an identifier (e.g., telephone number) of the central processing facility. The point of sale terminal uses the data to dial the central processing facility (or associate with the facility) when the communication link within the facility is already established.

Once communications are in place, an account corresponding to the wireless communications device is debited or credited at the central processing facility, depending upon the type of account, and the facility communicates back to the terminal that a transaction has been authorized and processed. In this embodiment, the central processing facility or the point of sale terminal may also transmit data, back to the communications device, indicative of the sales transaction made. At a minimum, data indicative of the transaction is stored in a central data base by the central processing facility including, the stored data includes information about the point of sale terminal, the monetary amount of the transaction, the date, location, and possibly time of the transaction. The signal sent from the central processing facility or point of sale terminal to the device may be stored in the device or displayed on a display thereof.

Alternatively, sales transaction is accounted for electronically in an account associated with the communications device and maintained by the central processing facility. That account is also utilized for accumulating information concerning other uses of the communications device. In this regard, the central processing facility also tracks or receives information pertaining to other uses of the device, such as telephone usage (for example), and accumulates that information in the account. Thus, the user of the electronic communications device will be invoiced with a combined invoice for multiple uses of the device, including, for example, the accumulation of all sales transactions made during a particular period of time, as well as the accumulation of all telephone calls made and/or received with the communications device during that particular period.

In an alternative embodiment of the invention, a communications link between the electronic communications device and the point of sale terminal is established in a different manner. In this embodiment, a first communications link is established between the electronic communications device and the central processing facility. A second communications link is established or is present between the central processing facility and the point of sale terminal at which the transaction is to be made. As will be appreciated, in any embodiment of the present invention, the link between the central processing facility and the point of sale terminal may be wireless or hard wired.

In one variation of this embodiment, the user of the electronic communications device connecting to point of sale inputs, utilizing an input of the device, an identifier associated with the point of sale terminal at which a transaction is to be made. For example, once connected to the central processing facility, the user may use a keypad of the wireless communications device (or the microphone for transmitting voice signals) for inputting an identification number (or telephone number) of the point of sale terminal at which a transaction is made. That information, when received by the central processing facility, permits the processing facility to automatically establish a communications link with the point of sale terminal at which a transaction is to be made, if such a link is not already established. Then, as before, an amount of monetary units sufficient to satisfy the sales transaction may be debited or credited to a corresponding account maintained by the central processing facility, or may be accumulated in an electronic account stored in a data base, for subsequent billing. Data indicative of the transaction may then be disseminated to and stored at (in addition to the central processing facility), the point of sale terminal and/or the wireless communications device.

In a variation of this embodiment, and as described in greater detail below, once a communications link is established between the electronics communication device and the central processing facility, the central processing facility determines or receives a location of the communications device and retrieves information from an associated data base regarding the location of point of sale terminals. The central processing facility then automatically selects a selected number of terminals within a predetermined area, or a selected number of terminals, up to a selected threshold number, that are in closest proximity to the location of the point of sale terminal, and then transmits information indicative thereof back to the device. The identities of the retrieved point of sale terminals are output at the device, either via the display, or through a speaker to permit the user to select the appropriate terminal at which the transaction is being made. In this regard, the central processing facility will prioritize the various terminals retrieved from memory in a manner such that the terminal in closest proximity to the current location of the device is provided first, thus allowing the user to default to that particular terminal. If, however, the terminal at which the sales transaction is actually being made is not the first terminal provided on the provided list, the user may use the device to select the appropriate terminal. This selection is made utilizing the keypad of the electronic communication device, or by a voice command, and information indicative of the selected terminal is transmitted back to the central processing facility, whereupon a communications link between the central processing facility and the point of sale terminal is established, or an association is made between the communications device and the link between the central processing facility and the point of sale terminal.

In situations in which a merchant has a plurality of uniquely numbered point of sale terminals, such as numbered checkout lines in a store or numbered gas pumps, and it is determined that the location of the device is proximate such a merchant the central processing facility will retrieve and transmit all of the terminals in chronological order, or may prompt the user of the communications device to enter the appropriate terminal number. Alternatively, a transaction number (such as an invoice number at a restaurant or a number displayed at a point of sale) may be input (e.g., manually or electronically such as by short message service or a short range wireless link such as Bluetooth technology). When that link has already been established, information indicative of the sales transaction, including at a minimum the monetary units required for the transaction, are transmitted to the central processing facility and either debited or credited to a corresponding account, or accumulated in an account for subsequent billing. An authorization or confirmation signal is then sent back to the point of sale terminal. As will be understood and appreciated in any embodiment, a written receipt of the transaction may be provided at the terminal if desired. Upon completion of the transaction, the communications link or links may be terminated.

As set forth in detail below, one preferred embodiment of the present invention, an on-line transaction system is provided, wherein a plurality of merchant point of sale terminals are connected via communications links to a remote central processing facility. Subscribers of telephone service may utilize their portable cellular telephone to make purchases at the point of sale terminals. In this regard, a users of wireless communications devices, (e.g., a cellular telephone), will activate a transaction feature of the cellular telephone. This may be accomplished by pressing an appropriate button on the keypad of the telephone, or by dialing the central processing facility, and then entering appropriate instructions. In any case, when a user of the cellular telephone desires to make a sale at a particular point of sale terminal, the user initiates a communications link with the central processing facility. The user then inputs, in some manner, the point of sale terminal at which a purchase is to be made. As described above, this may be done by entering a unique identifier associated with the point of sale terminal, or by the central processing facility in determining the location of the communications device and transmitting data indicative of the point of sale terminal for selection by the user. The central processing facility then associates the selected point of sale terminal with the portable communications device and electronically processes the transaction. It should be understood, however, that association of the telephone with the point of sale terminal may be done electronically, such as by placement of an encoded transponder in the telephone which is excited when placed within a field emitted from corresponding circuitry at the point of sale terminal, and thus transmits a code to the point of sale. In accordance with an aspect of the invention, the transponder is encoded with a code that corresponds to the telephone number of the device or which is associated (at the central facility) with an account of the subscriber.

In particular, an account associated with the electronic communications device will be debited or credited (depending upon the type of account) or monetary units corresponding to the sale made at the point of sale terminal are accounted to an associated account for subsequent billing. Additionally, as will be appreciated, monetary units corresponding to the transaction will be transmitted to an account corresponding to the merchant associated with the point of sale terminal at which the transaction is made. Once the transaction has been processed, the central processing facility transmits a confirmation signal to each of the communications device and the point of sale terminal via the respective communications links. Thus, for example, the portable communications device may display an indication that the transaction has been complete, which display may include information relating to the sale just made, or may provide an audible tone indicative of the completing of the transaction. Similarly, the point of sale terminal may provide an output, such as a display, an audible tone, and/or a printed receipt to indicate that the transaction has been complete.

In yet another embodiment of the present invention, the wireless communications device has a memory unit stored in its housing. The wireless communications device may be utilized to establish a wireless link to a financial institution having an associated bank account containing monetary units. Utilizing the keypad or voice commands, the wireless communications device may then be utilized to withdraw monetary units from the account for transmission to the device and for storage in the memory unit of the device. Subsequently, the wireless communications device may be utilized for conducting sales transactions by establishing a wireless communications link to the point of sale terminal, and transmitting an appropriate amount of monetary units from the internal memory to the point of sale terminal via a wireless communications link. In such a transaction, data indicative of the transaction may also be transmitted back to the wireless communications device, if desired. Alternatively, rather than being an off-line transaction as described, data indicative of the transaction may be transmitted, either by the device, or the point of sale terminal, to the financial institution associated with the account, or to another central processing and record keeping facility.

Additionally, it should be understood that a point of sale terminal may be an interactive television set or computer terminal. In such an instance, a television set or computer terminal operates in the same manner as a networked point of sale terminal as previously described. Accordingly, the interactive television set or computer terminal may itself be adapted to receive wireless communication signals from the communications device or, alternatively, the wireless communications device may be utilized to perform financial transactions, such as buying goods and services displayed over the computer terminal or television set, by communicating with the central processing facility which in turn communicates with the television set or computer terminal or, more preferably, the source of the content displayed at the television set or computer terminal.

A wide variety of other aspects are provided in conjunction with the present invention, as provided in more detail below. For example, data transmitted in conjunction with the present invention is preferably encrypted prior to transmission. In one embodiment of the invention, data is transmitted by encoding DTMF signals. In another aspect of the invention, depending upon the type of transaction terminal at which a transaction is to be made, the electronic communications device must be within a predetermined distance from the terminal in order to establish the proper wireless communications link or, alternatively, in order to complete the transaction (e.g., as determined by a position determination or when the device is within a range of communications determined by transponder/CID technology, a short-range wireless link such as Bluetooth technology, or signal timing technology).

In still other uses of the invention, when the electronics communications device is also a voice communications device, such as a cellular telephone, a voice link may first be established with the central processing facility, or more likely with a point of sale terminal, or an operator at one of those locations, and then financial transactions may be made by data transmissions that either interrupt or periodically interrupt the voice channel or occupy some percentage of the communications channel, while the remaining band remains available with voice communications. Additionally, the present invention provides additional security features, such as the use of voice recognition, particularly in the case when the electronics communication device is also a voice communications device, or by requiring a personal identification number (PIN) to be input by voice command or by keypad input. Other security features of the invention include transmittal of a stored image or signature of authorized users of the device for comparison at the point of sale terminal with the actual user or his/her signature.

Additionally, as set forth in detail below, while the preferred frequency band at which wireless communication links are established is at 900 MHz or greater, it is contemplated that other frequency band widths may be utilized. For example, in some applications, the link between the electronics communication device, and a point of sale terminal may be a two-way radio link, so long as the frequencies utilized may transmit data under FCC guidelines. Additionally, it should be understood that the networking utilized by the present invention may involve local area networks, or wide area networks and, particularly, may involve Internet connections to and transmissions via the Internet, or a global communications network.

In summary, and as set forth in detail below, the present invention provides a unique system, method and device for performing financial transactions at a point of sale terminal. By utilizing a cellular telephone, pager, or hand held personal computer with wireless transmission capabilities, the user is provided with a very convenient way of performing transactions at a wide variety of point of sale terminals. Additionally, and in accordance with one aspect of the invention, the user may choose, electronically, which of several accounts or billing methods he or she wishes to employ for conducting the transaction. Additionally, the invention provides for centralized and consolidated billing of purchases, as well as other uses of the electronic communications device, such as telephone calls. As will become apparent from the foregoing and following description, the invention may be utilized at check-outs, gas pumps, vending machines, drive-thrus, restaurants of all types, interactive televisions or computer terminals, and in conjunction with purchase orders made over the telephone.

BRIEF DESCRIPTION OF THE DRAWINGS

The objects and features of the invention noted above are explained in more detail with reference to the drawings, in which like reference numerals denote like elements, and in which:

FIG. 5b is a front perspective view of a portable, hand held telephone utilized in accordance with the principles of the present invention;

FIG. 5c is a front perspective view of an electronic pager utilized in accordance with the principles of the present invention;

FIGS. 5d and 5e are front perspective views of portable, hand held personal computers utilized in accordance with the principles of the present invention;

DETAILED DESCRIPTION OF THE INVENTION

The invention, described now with reference to the figures, is directed to a method, system and device for performing financial transactions, via a communications link, with a portable communications device. Each embodiment of the invention involves utilizing a wireless communications device, such as a wireless, hand held, or mobile telephone, an electronic pager, or a personal hand held computer for performing financial transactions, and particularly sales transactions, at transaction or point of sale terminals.

Figure 1:
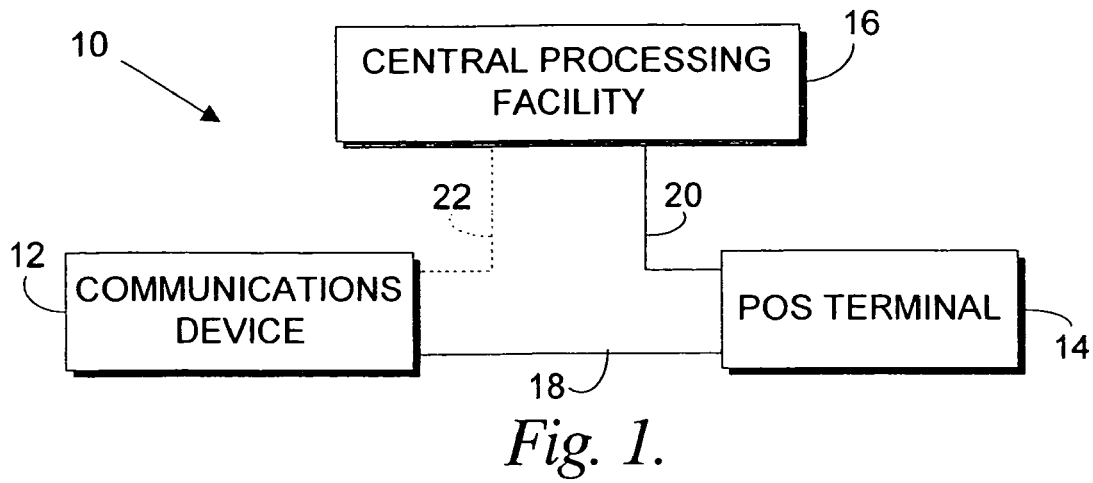
FIG. 1 is a block diagram of a first embodiment of a system of the present invention.

With reference initially to FIG. 1, a system of the present invention is illustrated generally by reference numeral 10. System 10 has a wireless communications device 12, a terminal, such as a transaction or point of sale terminal 14, and a central processing facility 16. In accordance with the invention, the central processing facility 16 is located remotely from the point of sale terminal. Additionally, for clarity, FIG. 1 has been simplified to show only the point of sale (or transaction) terminal 14. However, it will be understood that a great number of such terminals are preferably connected to, or connectable to, central processing facility 16. Additionally, it should be understood that point of sale terminal 14 may not connect directly to central processing facility, but may be connected instead to a transaction clearing facility, or other processing facility, which is in turn connected to the illustrated central processing facility 16.

As illustrated in FIG. 1, communications device 12 is connected via a communications link 18 to the point of sale terminal 14, while the point of sale terminal 14 is connected via a communications link 20 to central processing facility 16. Additionally, although not necessary, an additional communications link 22 may be established between communications device 12 and the central processing facility 16. As will be discussed in greater detail below, depending upon the embodiment of the present invention, communications link 18 is at least partially wireless, while communications link 20 may be wired or wireless.

Figure 2:
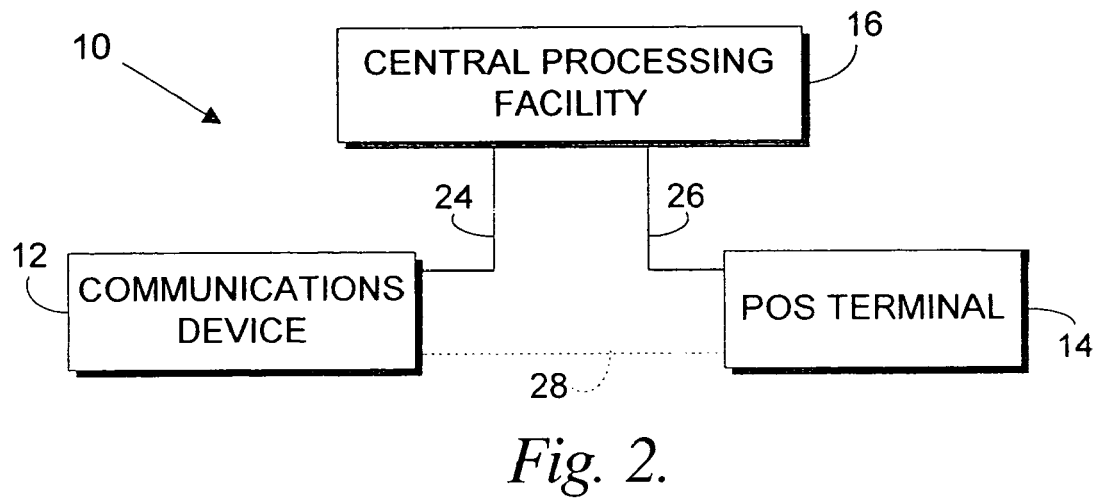
FIG. 2 is a block diagram of a second embodiment of a system of the present invention.

With reference now to FIG. 2, an alternate embodiment of the system 10 of the present invention is shown. In the embodiment of FIG. 2, the communications device 12, point of sale (or transaction) terminal 14, and central processing facility 16 are the same as illustrated in FIG. 1. However, as illustrated, in the embodiment of FIG. 2, wireless communications link 24 is established between communications device 12 and processing facility 16, and a wireless communications link 26 is established between the central processing facility 16 and the point of sale terminal 14. Additionally, although not necessary, a communications link 28 may be established directly between communications device 12 and point of sale terminal 14, as illustrated by communications link 28 shown in dashed lines. Again, and as will be set forth in detail below, the links 24 and 28 are at least partially wireless, while link 26 may be wired, wireless, or a combination thereof depending upon the overall construction of the system and the embodiment of the present invention that is being employed.

Figure 3:
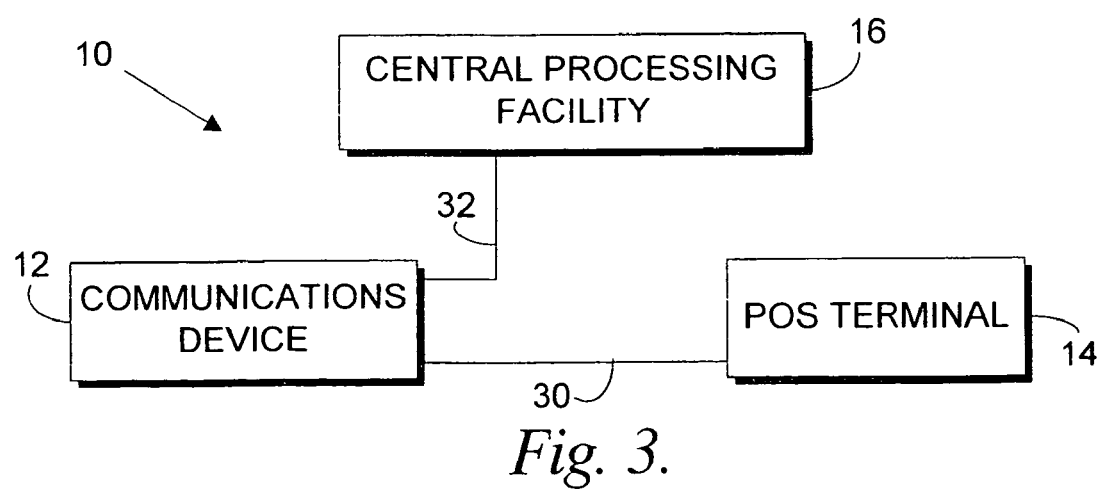
FIG. 3 is a block diagram of a third embodiment of a system of the present invention.

With reference now to FIG. 3, an additional embodiment of the present invention is shown. In this embodiment, communications device 12 is connected by a communications link 30 to the point of sale terminal 14. Additionally, a communications link 32 is shown as being present between communications device 12 and central processing facility 16. In the embodiment of FIG. 3, the central processing facility 16 preferably is, or is connected to, a financial institution having an account corresponding to the communication device 12, wherein the account holds monetary units. Additionally, and as will be set forth in greater detail below, the various communications links shown in the embodiments of FIGS. 1-3 may or may not be present simultaneously. For example, in the embodiment of FIG. 3, the communications device 12 is operable to connect via communications link 32 to central processing facility 16 for retrieval of monetary units from an account corresponding to the communications device 12. Data indicative of those monetary units is then transmitted via communications link 32, where it is stored in a memory unit of communications device 12, as described below. Once that data transfer has been completed, the communications link 32 may be terminated. Then, subsequently, as the user of communications device 12 desires to perform a financial transaction at point of sale (or transaction) terminal 14, a communications link 30 is established between the communications device 12 and 14. As will be described below, a selected amount of monetary units corresponding to a transaction or sale occurring at the point of sale terminal 14 is then transmitted from the memory of the communications device 12 via the communications link 30 to the point of sale terminal 14 to satisfy the transaction.

In particular, in the embodiment of FIG. 1, communications device 12 is utilized for performing a financial transaction at terminal 14. Terminal 14 is a point of sale terminal as illustrated, such as a point of sale terminal at a check out counter of a restaurant, check out counter of a store, or is positioned in a restaurant and is accessible by a communications link from various eating locations within the restaurant, or at a drive-thru. As will be appreciated, the point of sale terminal 14 may be virtually any type of point of sale terminal. For example, point of sale terminal 14 may be a vending machine that is not continuously operated by a merchant or employee, a gas pump, etc. Additionally, the point of sale terminal may be an interactive television or computer terminal.

In the embodiment of FIG. 1, a communications link 18 is established between a communications device 12 and the point of sale terminal 14. Preferably, the communications link 18 is established by a user of communications device 12 entering an appropriate identifier of terminal 14 using a keypad of the communications device. For example, the user may dial the point of sale terminal. Alternatively, where there are a plurality of point of sale terminals associated with a particular merchant, the user may first dial an identifier associated with a merchant, and then be prompted to enter a unique number associated with a particular terminal at which a transaction is being made. The point of sale terminal is linked by communications link 20 to central processing facility 16. At the point of sale terminal, a transaction such as a sales transaction involving a particular number of monetary units is to be made. The communications device 12 transmits an identifier unique to communications device 12 to the point of sale terminal, for association with the transaction. The point of sale terminal then transmits data indicative of that identifier and the sales transaction being made via communications link 20 to the central processing facility 16. Central processing facility 16 makes an accounting in an account associated with the device.

For example, central processing facility 16 may process a debit or credit account associated with communications device 12, such that data indicative of the monetary units associated with the transaction or sale at point of sale terminal 14 are accounted to that corresponding account. Additionally, in this embodiment, data indicative of the entire transaction, such as data, time, and location, in addition to monetary units, is stored by the central processing facility 16 in association with the account. Additionally, central processing facility 16 may then transmit a confirmation signal via communications link 20 back to the point of sale terminal 14, to verify that the transaction has taken place. Point of sale terminal 14 may then print a receipt, or transmit a signal via communications link 18 back to communications device 12, although that is not necessary. Alternatively, the central processing facility 16 may transmit a signal, via a link 22 back to communications device 12, which signal includes data indicative of the transaction and/or a data indicative that a sale or transaction is confirmed. It should be understood that communications link 20 may be a continuous link, or at least continuous during business hours of the business associated with the point of sale terminal 14, or may be established as needed. Alternatively, point of sale terminal 14 could accumulate transaction data for a particular period, and then transmit the data to facility 16 at selected times. In such an embodiment, however, confirmation of account status or verification that the communications device 12 is cleared to make the transaction would then have to be either obtained from a secondary facility, or from data stored internally, and thus in most situations, this format will not be acceptable for this particular embodiment.

With reference now to FIG. 2, an alternate embodiment of the invention is illustrated and described. As a setting for the embodiment of FIG. 2, the system 10 is again utilized to make an electronic transaction, and preferably a sales transaction, at point of sale terminal 14, utilizing communications device 12. In this embodiment, however, a communications link 24 is established between communications device 12 and central processing facility 16. In order to link communications device 12 with the point of sale terminal 14 at which a transaction if to be made, a communications link 26 is established between central processing facility 16 and point of sale terminal 14. As will be understood and appreciated, the link 26 may be already established, or be established as needed. In the embodiment of FIG. 2, it is necessary for the central processing facility 16 to have knowledge of the particular point of sale terminal 14 at which a transaction is made. In this regard, one approach of the present invention is for the user of communications device 12 to input an identifier, unique to the point of sale terminal 14 at which a transaction is to be made, into the communications device 12. This unique identifier may be entered with an input of the communication device, such as a keypad, or by voice command. Data indicative of that unique identifier is then transmitted via communications link 24 to central processing facility 16, which in turn utilizes that information to either establish the communications link 26, or associate the particular point of sale terminal 14 with the unique identifier with the communications device 12.

Alternatively, the particular point of sale terminal 14 at which a transaction is to be made can be determined in another manner. For example, each point of sale terminal 14, of the plurality of point of sale terminals utilized with system 10, may have a unique identifier and geographic coordinates corresponding to the location of point of sale terminal 14 stored in a memory associated with central processing facility 16. Additionally, central processing facility 16, in this variation of the embodiment, has means for determining the location or approximate location of the communication device 12. For example, communication device 12 may also incorporate, for example, an integral global positioning system (GPS) unit (not shown). As is known, such a GPS unit has the ability to calculate its position. Thus, data indicative of the position of the communications device 12 is transmitted via communications link 24 to central processing facility 16, which in turn utilizes that data to search for point of sale terminals 14 within a predetermined distance of the current location of communication device 12 or, alternatively, the system 10 may be set up to search for a selected number of point of sale terminals that are closest to the current location of communications device 12.

Once data indicative of those point of sale terminals 14 which meet the search criteria are retrieved from a memory associated with the central processing facility 16, the processing facility 16 prioritizes the terminals in order from the closest to the current location of communication device 12 to the farthest from communication device 12. The data is then transmitted back via communications link 24 to communications device 12, such that the user of communications device 12 can select the actual terminal at which he or she is desiring to make a sale or transaction. For example, the identifier of each terminal may be displayed on a display of the communications device, such that the user may scroll through the retrieved terminals and make the appropriate selection. Alternatively, the data may be transmitted to communications device 12 in voice format, either by a voice recording or synthesized voice, to permit the user to make an appropriate input (by voice or by keypad) when he or she is given the actual terminal 14 at which a transaction or sale is desired to be made. Data indicative of the selected point of sale terminal is transmitted back to the central processing facility 16, and the link 26, or an association with link 26, is made.

One problem with conventional GPS units is that they do not perform properly indoors. Accordingly, other techniques for determining the location of communications device 12 may be utilized and, indeed, are preferred. For example, using geometric techniques, such a triangulation, the location of communication device 12 may be determined by triangulation with respect to known locations of cellular towers (or satellites), for example. Such technology is not limited to use outdoors, and thus is more appropriate for making such a calculation, at least in those areas where cellular towers are readily available. In short, there are various known techniques for making a determination of the position of an electronic device, and the present invention contemplates and covers utilizing one or more such technologies for determining the position of device 12, to permit the central processing facility 16 to make an association with a particular point of sale terminal 14.

Alternatively, the point of sale terminal at which a transaction is to be made may be determined by the user of the communications device 12 placing the device 12 within a necessary range of the point of sale terminal. For example, an encoded transponder which transmits a code when properly excited electronically may be placed within the communications device 12. Additionally, the circuitry for generating an electrical field about the point of sale terminal may be placed within a point of sale terminal such that, when the communications device is within the generated field, the transponder is electrically excited and transmits encoded information to the point of sale terminal. The system may be implemented such that transmittal of the encoded information requires additional input by the user, or more preferably, such that a final input is required before financial settlement takes place. The encoded transponder may be encoded with information corresponding to the telephone number or subscriber of the communications device 12. For example, the encoded information may be the telephone number in the event the device is a wireless communications device. Alternatively, the encoded number many simply be a unique number which, when transferred to the point of sale terminal, is transmitted to the central processing facility, where it is associated with an account corresponding to the device 12. It is also contemplated that short-range wireless technologies such as Bluetooth or similar technologies may be utilized for communicating between the device 12 and the point of sale terminal. As is known, a short-range wireless communications link made according to the Bluetooth specification may be developed so as to define a distance in which communications may take place. Alternatively, for example, measuring the timing of signals between the communications device 12 and the point of sale terminal may be utilized for determining the distance. For example, a pulse sent from one of the wireless communications device and the point of sale terminal to the other and back again may be timed and, when that time is less than a selected threshold, it serves as an indication the device 12 is within a predetermined range of the point of sale terminal.

Accordingly, in the embodiment of FIG. 2, once central processing facility 16 has associated the point of sale terminal 14 at which as transaction is to be made with the communications device 12, data indicative of the transaction, including at a minimum, monetary units associated with the transaction, is transmitted from the point of sale terminal 14 via communications link 26, to central processing facility 16, where the monetary units associated with the transaction are accounted in an account corresponding to the communications device 12 (e.g., a credit or debit account). Alternatively, the data may be accumulated in an account for subsequent billing. Additionally, monetary units associated with the sale are electronically debited to an account corresponding to a merchant associated with the point of sale terminal, or are at least transmitted to another processing facility which in turn debits the appropriate account.

Finally, one or more confirmation signals may be sent from central processing facility 16 to indicate that the transaction has been confirmed and completed. For example, a confirmation signal could be, and preferably is, sent via communications channel 26 to point of sale terminal 14. The terminal 14 may output a tone, a display, and/or a receipt. Additionally, a confirmation signal may also be sent via communications link 24 to the communications device 12. The confirmation signal may cause the device to emit an audible tone, such as a "beep-beep" and/or may result in the display of wording, such as "transactions complete", and/or data relative of the transaction on a display of the device. Alternatively, the point of sale terminal 14 may directly communication with communications device 12 via a link 28, which may be established, although is not necessary in the embodiment of FIG. 2. As stated above, the central processing facility 16 may link to one or more other facilities, such as a financial institution and clearinghouse or facility associated with a merchant for confirming sales. Accordingly, device 12 associated with the use of the term "central processing facility" encompasses separately or in combination with a processing facility associated with the device 12 or a subscriber thereof, a processing facility associated with a point of sale terminal or a merchant, or a financial institution Turning now to FIG. 3, yet another variation of the present invention is illustrated and described. As a setting for the embodiment of FIG. 3, it is desired again to make the transaction at a point of sale terminal 14 utilizing communications device 12. In this embodiment, however, the communications device 12, as set forth in detail below, has a memory for storing data indicative of monetary units. That data is retrieved from a central processing facility 16 which, in this embodiment, is preferably linked to a financial institution associated with communications device 12, or indeed, is a financial institution. Thus, for example, the user of communications device 12 may link to central processing facility 16 via communications link 32, and withdraw monetary units from an account corresponding to the communications device. Such selections may be made utilizing voice commands, when central processing facility has voice recognition components, or may be utilized with a keypad of communications device 12.

Once data indicative of a selected amount of monetary units are transmitted via communications link 32 and stored in memory of the communications device 12, that data is then available for use in making purchases, such as a purchase at point of sale terminal 14. Accordingly, communications device 12 may be utilized to establish a communications link 30 with point of sale terminal 14 for making a cashless transaction. In particular, data indicative of the amount of monetary units corresponding to a transaction or sale to be made at point of sale terminal 14 is transmitted via a communications link 30 to point of sale terminal 14. One advantage, or disadvantage, depending upon the perspective, of the embodiment of FIG. 3 is that it system 10 may be utilized in an off-line, like cash mode. In other words, unlike the embodiments described in accordance with FIGS. 1 and 2, the embodiment of FIG. 3 is more like a cash transaction, in that data indicative of the sale need not be transmitted to a central processing facility for accounting.

Figure 4:
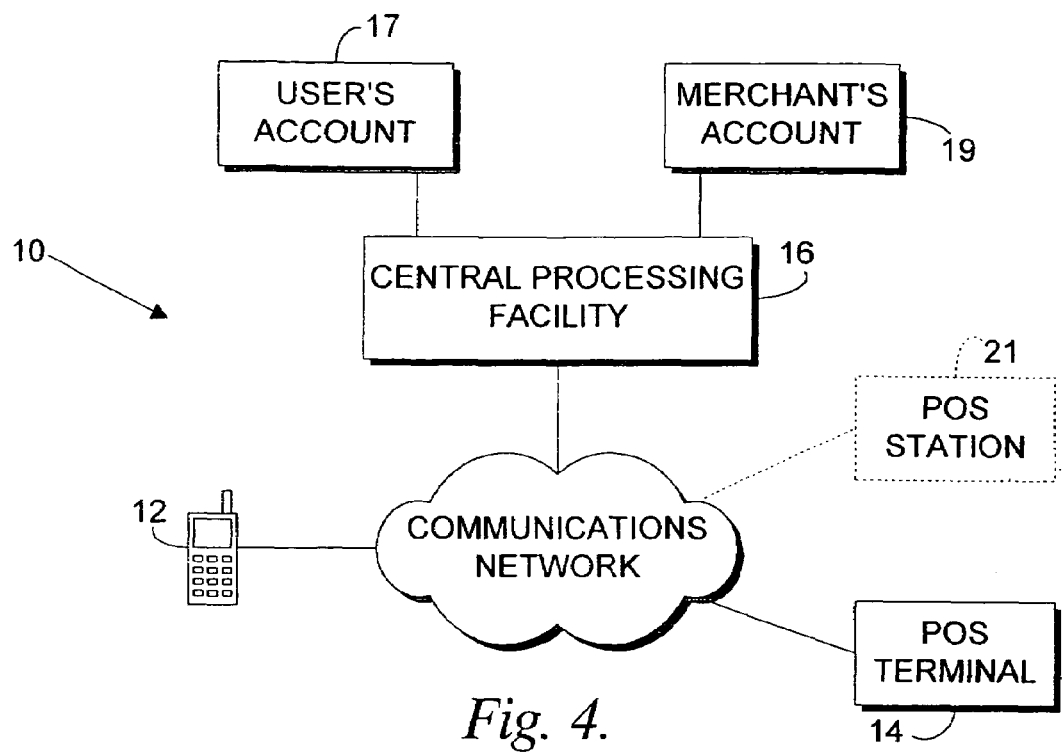
FIG. 4 is a generic block diagram of the system of the present invention.

As will be appreciated in view of the foregoing, the present invention permits the user of a wireless, electronic communications device, such as a cellular telephone, to make transactions and, particularly, purchases at point of sale terminals. As has been described, and will be appreciated, the manner in which communications are made will vary, depending upon implementation of the system. Accordingly, set forth in FIG. 4, is an illustration of a generic embodiment of the present invention, in which the communications device 12 (shown as a cellular telephone), the point of sale terminal 14, and the central processing facility 16 are interconnected through a communications network. Again, as will be appreciated, the various communications links may or may not be established simultaneously. Additionally, the communications network illustrated may include solely traditional telephony-type of network, may include the Internet, or both. For example, system 10, and particularly the components thereof, preferably supports global wireless communications systems utilizing CDMA (code division multiple access), TDMA (time division multiple access), iDEN (integrated digital enhanced network), PHS (personal handiphone system), GSMC (global system for mobile communication), CDPD (cellular digital packet data), PCS (personal communications service), and/or PDC (personal digital cellular). It will be understood and appreciated that system 10 may incorporate and utilize other communications technologies, and may for example communicate via a variety of protocols, including but not limited to, the Wireless Application Protocol (WAP).

In particular, as set forth in FIG. 4, system 10 includes a communications device 12, a point of sale terminal 14, a central processing facility 16. Also illustrated is a "user's account" 17 and a "merchant's account" 19 connected to the central processing facility. It should be understood and appreciated that these accounts may in fact be electronic accounts stored in memory at the location of the central processing facility or, alternatively, at a location remote from the central processing facility such that communication with the respective accounts requires a communication link via the communications network. Thus, for example, the user account 17 may be a bank account maintained by a financial institution, or may be a credit card account, such as maintained by a credit institution, such as MasterCard, Visa, or others. Similarly, the merchant's account may be an account maintained by a financial institution, such that the merchant's account is in fact a memory located remotely from central processing facility 16.

Also shown in FIG. 4, in broken lines, is a point of sale station, indicated by reference numeral 21. Point of sale station 21, as illustrated, is also connected to, or connectable to, a communications network. In this regard, the point of sale station 21 may be construed as part of the point of sale terminal 14. As will be appreciated, many conventional point of sale systems involve point of sale terminals, such as point of sale terminal 14, connected via a communications network to processing facility, such as point of sale station 21. As will be appreciated, the merchant's account 19 may in fact be connected to the point of sale station 21, either locally or via the communications network. Thus, as will be appreciated, depending upon the embodiment of the present invention employed, the communications device 12, when communicating with a point of sale terminal, may in fact be communicating with point of sale station 21, which itself is affiliated with the actual point of sale terminal 14 at which a transaction is being made. Thus, in accordance with one aspect of system 10 of the present invention, point of sale terminal 14 may be nothing more than a "dummy" terminal, connected via a network to central processing facility 16 and/or point of sale station 21. Thus, point of sale terminal 14 may have only a display, and one or more inputs, such as a keypad or scanner. Information input into the point of sale terminal in connection with the sale is then transmitted via the communications network to the central processing facility (either directly or via point of sale station 21), for association with information indicative of communications device 12.

As described above, wireless communications device 12 may be utilized to make transactions at a point of sale terminal simultaneously with voice communications which may take place between the device 12 and the terminal or an operator associated with the terminal or an operator associated with a merchant corresponding to the terminal. In one embodiment, transmissions of data from the wireless communications device to the processing facility associated with the point of sale terminal, where that data is indicative of a desire to make a transaction utilizing the device 12, may be made by transmitting the signal on a subcarrier band of the communications channel. Alternatively, the voice signal may be temporarily interrupted and, if necessary, periodically interrupted, during which interruptions the data transmission is sent. It is specifically contemplated and is within the scope of the present invention to provide an Internet (or related) telephone device which permits voice to be transmitted over the Internet via an Internet (or related) protocol and, which also permits data transmission via an Internet (or related) protocol. In one specific embodiment of the invention, once data indicative of the monetary amount corresponding to a desired sale has been entered into a point of sale terminal, the user may cause device 12 to transmit a signal indicating that the transaction is to be settled. This may involve the point of sale terminal (or associated processor) transmitting a signal to the device 12 to indicate that settlement may take place. Alternatively, a signal indicative of the desired settlement may be transmitted at the beginning of a transaction process, even though the ultimate monetary amount of the transaction has not been determined or entered at the point of sale terminal. In a variation of these embodiments, a selected time frame may be established during which the user of device 12 must communicate the desire to settle the transaction. In this regard, for example, while that indication may be made by utilizing the keypad of the device 12, it alternatively may be made when the system recognizes voice commands, such that the user can simply speak into the microphone of the device 12 during the preselected time frame appropriate commands to begin the transaction settlement process. In this regard, it will be understood and appreciated that the simultaneous voice/data transaction feature of the present invention may be employed with devices 12 that are wireless or, alternatively, with nonwireless devices, such as voice enabled computing terminals connected to a global communications network (such as the Internet) or the more recent Internet enabled telephones. In particular, it should be understood and appreciated that device 12 as well as the point of sale terminal, or its associated processor (whether local or remote) will store software permitting the necessary data communications and settlement processes to occur.

As described above, communications network may involve a variety of types of networks and, in fact, the communications link employed by the present invention may utilize different protocols for various links. Thus, for example, a link between communications device 12 and central processing facility 16 may be of conventional cellular link, whereas the link between a point of sale terminal 14 and/or point of sale station 21 and the central processing facility 16 may be an Internet link. Alternatively, the link between the communications device 12 and central processing facility itself may be an Internet link, utilizing a software such as that provided by phone.com, while the link between the point of sale terminal 14 and/or point of sale station 21 and the central processing facility 16 may comprise conventional telephony protocols. Alternatively, all links utilize either telephony Internet protocol, or other protocols for transmitting data. It will simply be necessary for the central processing facility 16 to recognize the protocols utilized, and make the necessary information association.

Figure 5A:
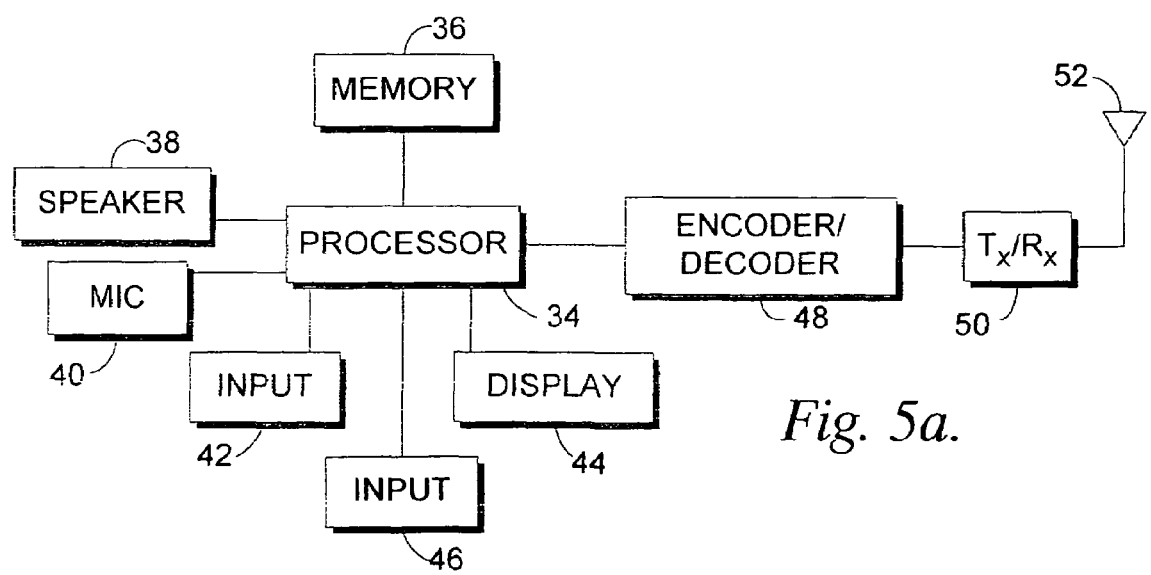
FIG. 5a is a block diagram of a communication device of the present invention.

With reference to FIG. 5*a*, a communication device of the present invention is illustrated and described in detail.

Connected to the processor 34 are a memory 36, a speaker 38, a microphone 40, a display 42, a first input, such as a keypad 44, a second input, such as a button, switch, toggle switch, or rotary switch 46, and an encoder/decoder 48. It should be understood that the encoder/decoder 48 is utilized for encoding and decoding data transmissions to and from the communications device. In the preferred embodiment, the encoder/decoder is a DTMF encoder/decoder, which encodes and decodes DTMF signals. However, it should be understood and appreciated that other types of encoding/decoding may be utilized, and may be incorporated within processor 34 directly. In this regard, there are a wide variety of encryption techniques which may be employed with the present invention in lieu of, or in addition to, DTMF encoding and decoding. A transceiver, including a transmitter and receiver, 50 is connected to the encoder/decoder (or directly to the processor 34 when the encoder/decoder 48 is not used). An antenna 52 is connected to the transceiver 50. A power supply (not shown), such as a battery (or in the case of a mobile (or telephone, a DC outlet and adapter) is provided. A transponder (not shown) may be utilized to store a code corresponding to device 12. The components of communications device 12 are preferably housed in, or in conjunction with, a portable hand held housing.

For example, as illustrated in FIG. 5*b*, communications device 12 is a portable, hand held telephone having a housing 54 which houses the electronic components. As illustrated, the display 42, keypad input 44, and input 46 are accessible at an exterior of the housing. As illustrated in FIG. 4*c*, the communications device 12 is an electronic pager. As illustrated in FIG. 5*d*, the communications device 12 is a portable, hand held personal computer.

Accordingly, in the preferred embodiments thus far illustrated and described, communications device 12 is a portable, hand held electronic device having wireless transmission capabilities. In the most preferred embodiments, communications device 12 is capable of transmitting both voice and data signals, although in the simplest form of the invention, the device need only transmit data signals.

Figure 6:
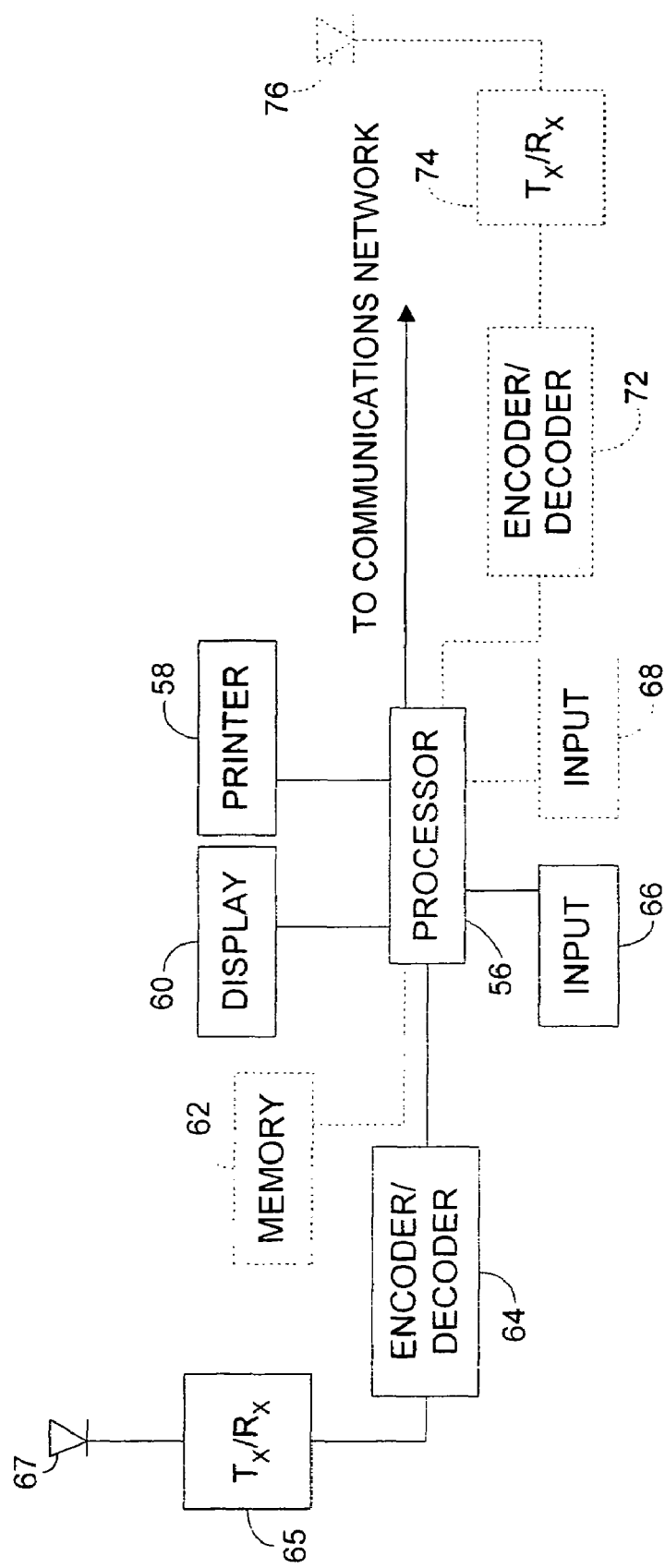
FIG. 6 is a block diagram of a transaction or point of sale terminal of the present invention.

With reference now to FIG. 6, the point of sale terminal of the present invention is illustrated and described in detail.

The point of sale terminal has a processor 56. Connected to processor 56 are a printer 58, a display 60, an optional memory 62, an encoder/decoder 64, a first input, such as a keypad input 66, a second input, such as a scanner or bar code reader 68. Connected to the encoder/decoder 64 is a transceiver, including transmitter and receiver 65, which in turn is connected to an antenna 67. Additionally, processor 56 is capable of connecting to a standard communications network, such as a wired or wireless communications network, as indicated at line 70. In the case where the processor 56 utilizes wireless transmissions to connect to a communications network, an additional encoder 72, transceiver 74, and antenna 76 may be employed. Again, encoder/decoder 64 (and 72 if utilized) is preferably a DTMF encoder/decoder. Such an encoder/decoder may be utilized for encoding conventional DTMF signals for the transmission of data. In other words, when the point of sale terminal 14 is receiving data from communications device 12, that data may be transmitted with DTMF signals having been encoded by the encoder 48 of the communications device 12, and then whereupon it will be decoded by the encoder/decoder 64 at the point of sale terminal. Again, however, it should be understood and appreciated that various types of data transmission techniques may be utilized, and various forms of encryption of data for security purposes may be employed, in addition to, or in lieu of DTMF encoding and decoding. Additionally, the point of sale terminal may include an identification device (such as a customer identification device, or CID) which generates a signal for exciting a transponder within the device 12 to transmit its coded data.

Additionally, as described in conjunction with FIG. 4, point of sale terminal 14 may be a "dummy terminal", such that the various input, output, and display devices merely interface with a communications network before connecting with remote servers and processing units. In such a system, a plurality of point of sale terminals are connected in an on-line manner to servers and processing units, such that the processing capability at the actual location of the terminal is minimal or non-existent.

Figure 7:
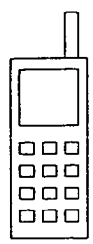
FIG. 7 is a block diagram of a central processing facility utilized in accordance with the present invention.
Figure 7:
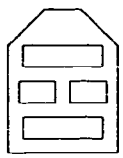
Figure 7:
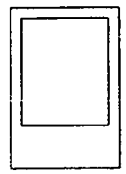
Figure 7:
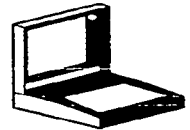
Figure 7:
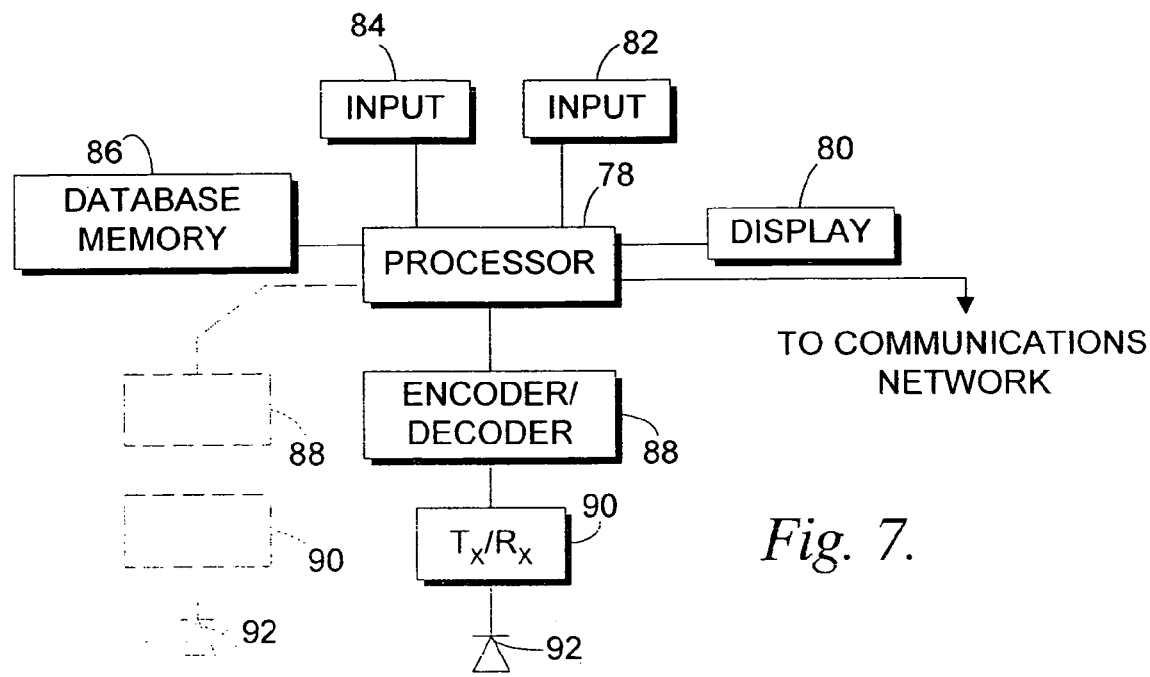

With reference now to FIG. 7, the central processing facility 16 is illustrated and described. Central processing facility 16 has a processor 78. Connected to processor 78 are a display 80, a first input, such as a keypad 82, a second input, such as display 84, a data base memory 86, an encoder/decoder, such as a DTMF encoder/decoder 88, and transceiver, including transmitter and receiver, 90 connected to encoder/decoder 88 and an antenna 92. In practice, the central processing facility is adapted to receive a wide variety of communication links simultaneously, and thus will have a number of "lines" or "channels" upon which to communicate. This is illustrated in broken lines, where the additional lines are wireless. Additionally, as illustrated by line 94, the central processing facility, and particularly processor 78, may connect to a communications network in hard wired fashion. In short, it should be understood that central processing facility 16 is adapted to process, transact, and/or account for sales made by a user utilizing communications device 12. As will be understood and appreciated, it is desired that a large number of such users will use, and in fact simultaneously use, the system 10. With the system of the present invention, large numbers of subscribers of cellular telephones would be able to perform financial transactions, and particularly sales transactions, at point of sale terminals that are part of the system 10. Accordingly, in practice, central processing facility will likely utilize a large number of processors, and will employ a plurality of terminals, such as display and keypad, which an operator may access the system. Accordingly, central processing facility 16 has been illustrated in block diagram form with those components that will be utilized in accordance with the present invention, although it should be understood that in order to handle the probable volume, a much larger system with additional such components will likely be needed.

Figure 8:
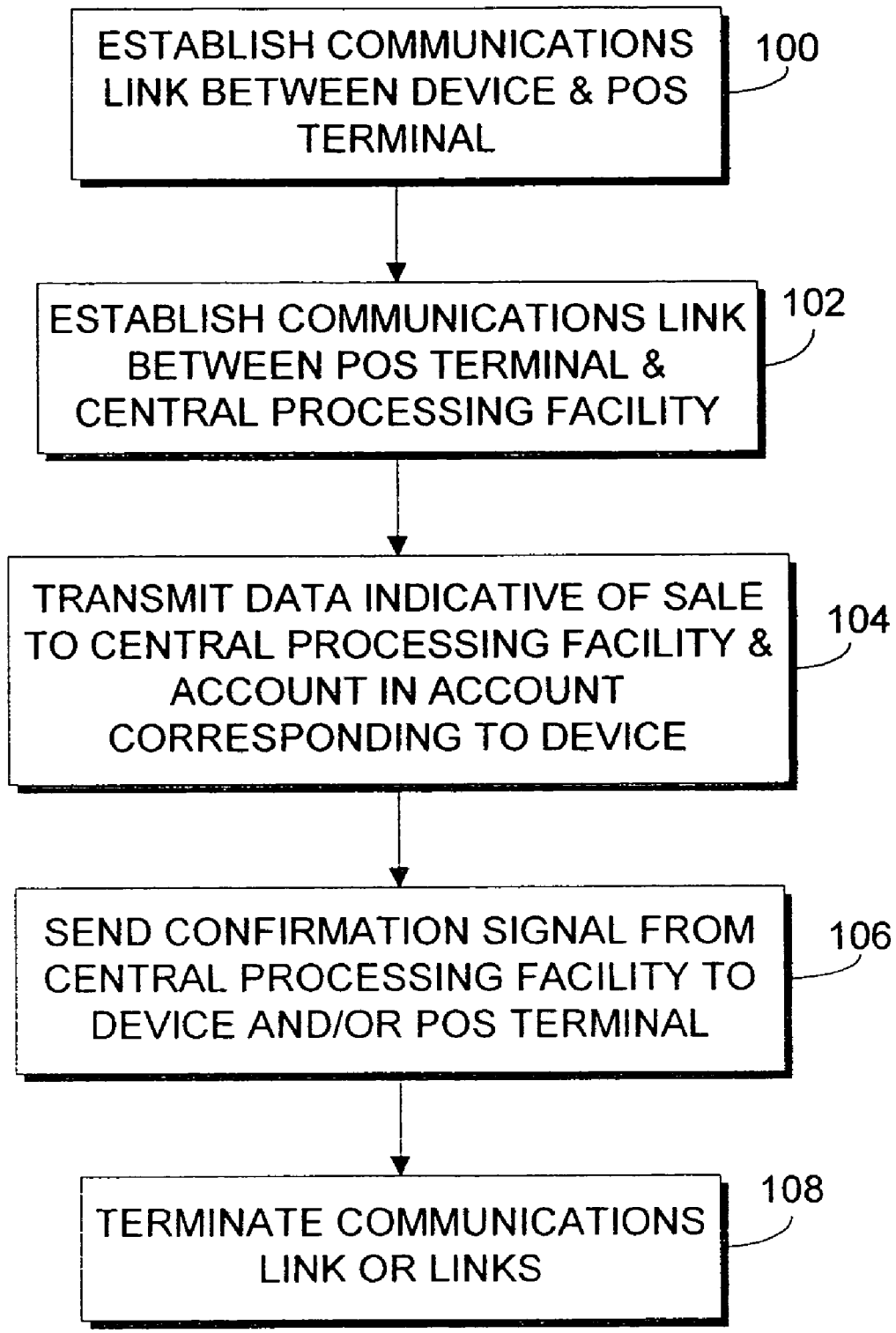
FIG. 8 is a flow diagram illustrating method steps of one embodiment of the present invention.

Turning now to FIG. 8, use of the present invention is illustrated and described. In particular, utilization of the present invention in a first embodiment is illustrated and described.

Particularly, with references to FIGS. 1 and 8, as indicated by step 100 of FIG. 8, communications link 18 is established between communications device 12 and point of sale terminal 14. Preferably, a user of communications device 12 establishes the link 18 utilizing an input of the communications device 12, such as the keypad input 46 or, where voice recognition componetry is provided, utilizing microphone 40. It should be understood, however, that the communications link 18 could be established by the point of sale terminal 14, such as by dialing a unique identifier (e.g., telephone or pager number) associated with the communications device. The dialed number could be input by an operator at point of sale terminal 14 utilizing keypad input 66 or, alternatively, point of sale terminal 14 could determine the identity of communications device 12 electronically, if the communications device 12 had transmitted its position coordinates to the central processing facility 16, such as by link 22 of FIG. 1.

Additionally, as set forth at step 102 of FIG. 7, a communications link 20 (FIG. 1) is established between point of sale terminal 14 and central processing facility 16. As will be appreciated, the communications link 20 may be hard wired or wireless, and may have already been established, or may be established when point of sale terminal 14 is invoked by communications device 12.

As has been discussed, and as will be appreciated, point of sale terminal 14 is a terminal at which a sales transaction is desiring to be made by the user of communications device 12. The sale to be transacted has some associated monetary value, as determined in any number of conventional ways. As indicated at step 104 FIG. 7, data indicative of the sale transacted is transmitted to the central processing facility 16, via communications link 20, whereupon it is accounted for in an account corresponding to device 12. As has already been described, such an accounting may involve debiting or crediting an account corresponding to device 12, or accumulating the data indicative of this sale in an account for subsequent billing. Similarly, an appropriate accounting is made electronically to an account associated with the point of sale terminal 14.

Once the appropriate accounting has been made by central processing facility 16, central processing facility 16 communications a confirmation signal back to the point of sale terminal 14 utilizing communications link 20, as indicated at step 106 of FIG. 7. Although not illustrated in FIG. 7, point of sale terminal 14 may also communicate a confirmation signal back to the device 12 or, alternatively, the central processing facility may communicate a confirmation signal to device 12 via a second communications link 22, although that is not needed nor preferred. In this regard, it will be understood and appreciated that the communications link 22 may be established after the communications link 18 is terminated or, simultaneously, where communications device 12 has more than one "line" or "channel". In this regard, it is contemplated by, and within the scope of the invention, that in each embodiment of the invention, that the system 10 could be constructed so that the communications device 12 communicates with the point of sale terminal 14 at a first frequency, while communications between the communications device 12 and the central processing facility 16 are conducted at a second frequency. As indicated at step 108 of FIG. 7, following the transmission of a confirmation signal from the central processing facility to the point of sale terminal, the communications link 18 and 20 are terminated. It should be understood and appreciated that other steps of the transaction may be provided. For example, a paper receipt may be printed at the point of sale terminal, which may or may not be required to sign by the user of communications device 12.

Figure 9A:
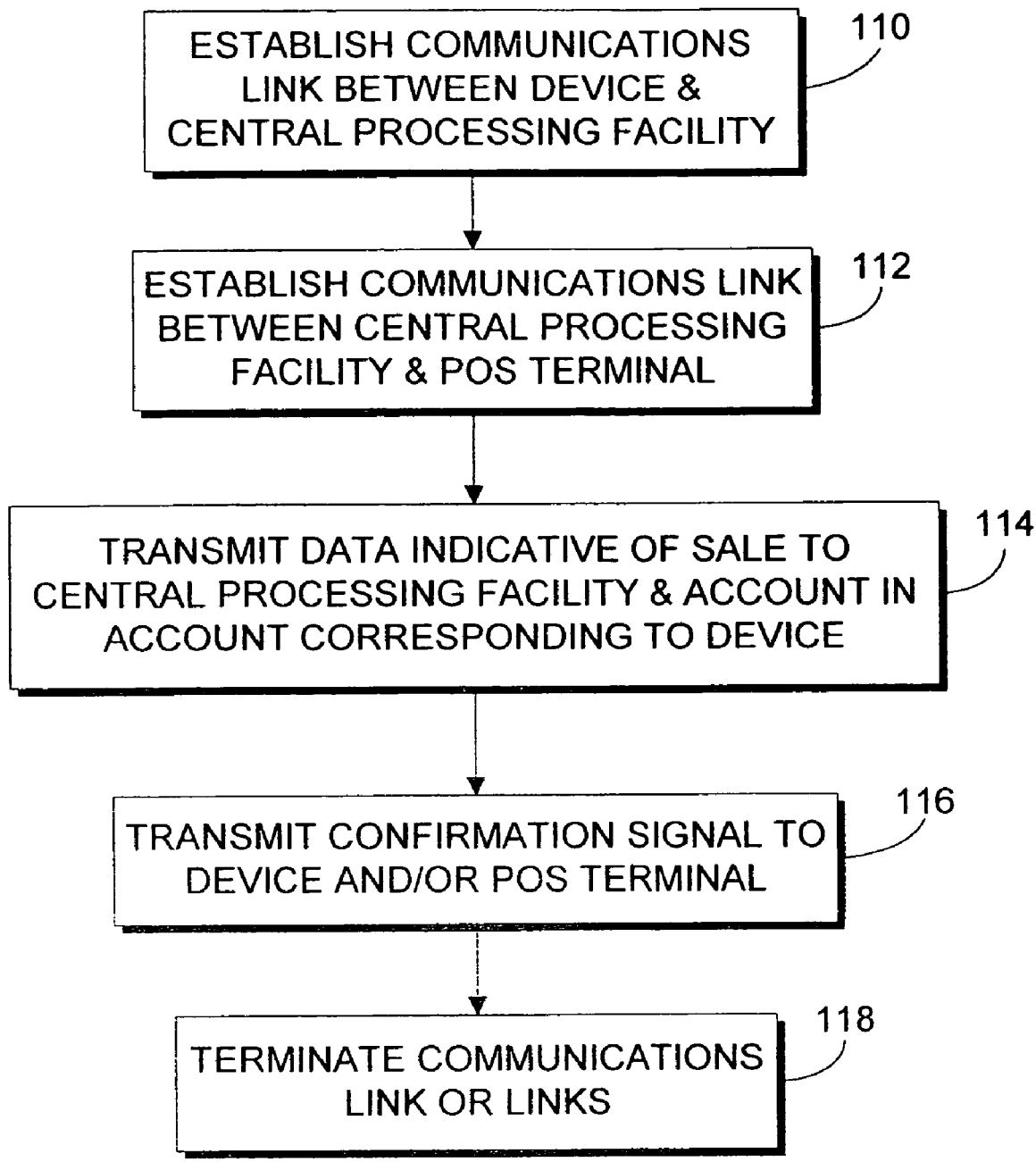
FIG. 9a is a flow diagram illustrating method steps of an additional embodiment of the present invention.

With reference now to FIG. 9a (and 2), use of an alternate embodiment of the invention is illustrated and described. In this embodiment, and as illustrated at step 110 of FIG. 9a, a communications link is established between communications device 12 and central processing facility 16, as indicated by communications link 24 of FIG. 2. As indicated at step 112 of FIG. 8, a communications link is established between the central processing facility and point of sale terminal 14, as indicated by link 26 of FIG. 2. As has been described, and as will be appreciated, communications link 26 may have already been established, or may be established when central processing facility 16 is invoked by communications device 12 for establishing such a link. Additionally, communications link 26 may be wired or wireless, whereas communications link 24 is wireless. As briefly described above, the establishment of a communications link between the central processing facility and point of sale terminal, or its association with device 12, as carried out at step 112, may be initiated by a user of communications device 12 entering a unique identifier of point of sale terminal 14 or, selecting from a list or alternatively, by associating the position of the communications device 12 with the position of the point of sale terminal 14.

Figure 9B:
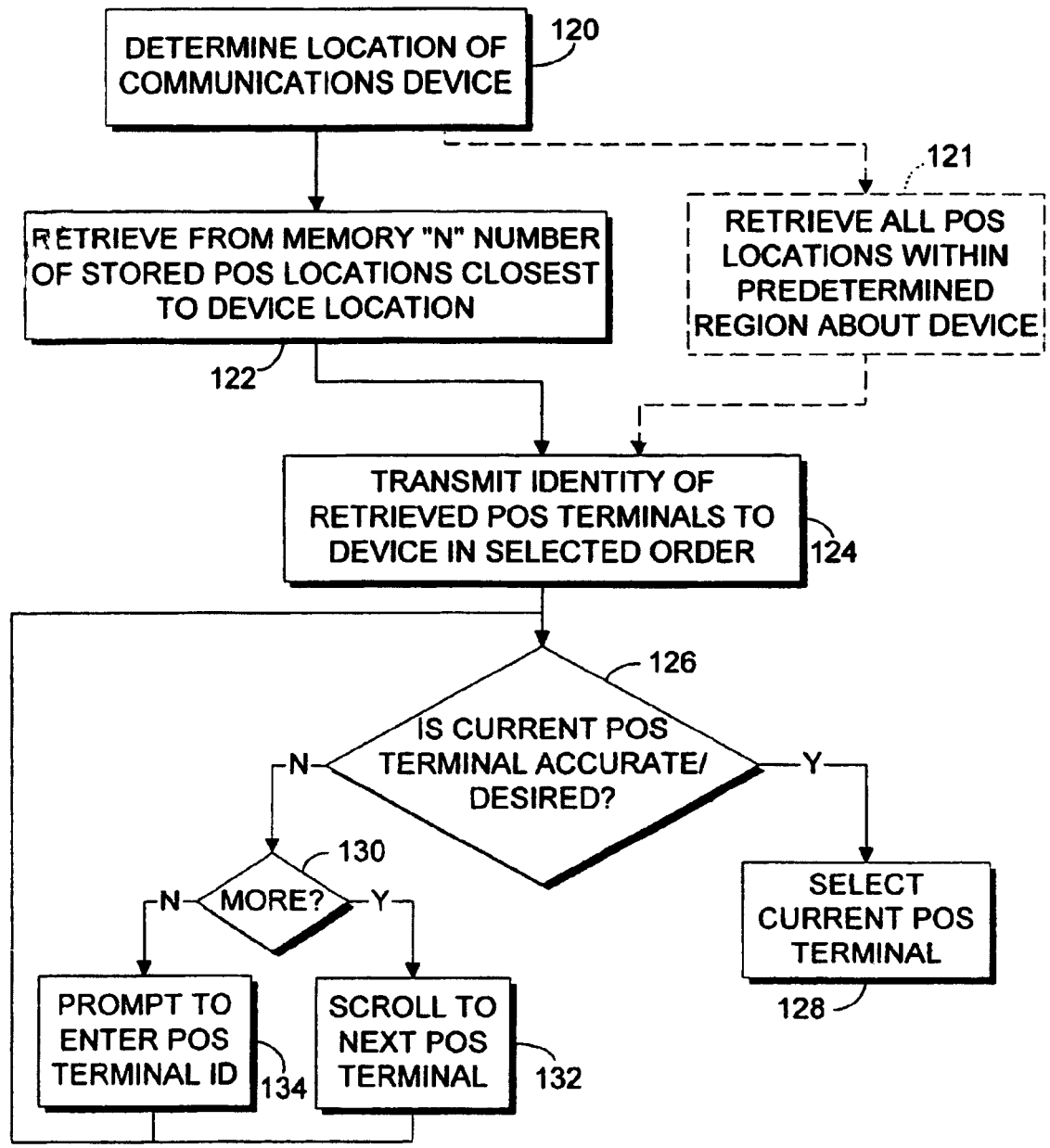
FIG. 9b is a flow diagram illustrating a variation of the embodiment of the present invention in which the location of the communications device is determined.

With reference to FIG. 9b, in an embodiment of the present invention wherein system 10 determines the respective positions of device 12 and terminal 14, processing proceeds as set forth in FIG. 9b. Particularly, as indicated at step 120 of FIG. 9b, the central processing facility 16, and particularly processor 78, determines the location of communications device 12. This determination is made by receipt of data, via the wireless communications link 24, from communications device 12. Particularly, that data includes the location or proximate location of the device 12, as determined in one of a variety of conventional manners. For example, the device 12 may incorporate a GPS unit, and transmit its location data as determined by GPS. Alternatively, the location of device 12 may be determined using triangulation technique from positions of known towers (rather than from satellites, as with GPS). In the preferred embodiment, device 12 is capable of being used indoors, and thus relies upon non-GPS techniques or, alternatively, may utilize GPS techniques where the device 12 is connected to an outside antenna. However, as will be appreciated, in the preferred embodiment of the present invention, communications device 12 is a conventional cellular telephone, pager, or wireless transmission equipped, personal, hand held computer, and does not require elaborate connections to external antennas, etc.

Once the location of communication device 12 is established, processing advances to step 122, wherein processor 78 of central processing facility 16 retrieves data from memory indicative of point of sale terminals 14. In particular, geographic location data corresponding to each point of sale terminal 14 is stored in data base memory 86 of central processing facility. Thus, and according with one method, processor 78 retrieves locations of point of sale terminals 14 within a predetermined distance from the then current location of communication device 12, as indicated at step 122 of FIG. 8b. Alternatively, the processor 78 may simply retrieve a selected number of point of sale terminals that are closest in location to the then current location of communication device 12, as alternatively indicated at step 122 of FIG. 9b. As indicated at step 124 of FIG. 9b, the retrieved data is prioritized in the order from the closest to the then current location of communications device 12, to the farthest, and that data is transmitted to communications device 12. The data may be transmitted in data format, or voice synthesization, or recording format, although is preferably transmitted in data format, such that the data appears on the display screen 42 of communication device 12. As indicated at step 126, the user determines whether the initially indicated point of sale terminal 14 is the actual terminal 14 at which a transaction is desired to be made and, if so, that terminal is selected such as by use of keypad input 44 or switch, toggle, or rotary input 46, as indicated at step 128. Thus, however, the initially listed point of sale terminal 14 is not the terminal at which a transaction is desired to be made. The user then makes an appropriate input, e.g., with keypad 44, input 46, or microphone 40, where voice recognition is provided, to select the next point of sale terminal on the list, and so on, until the actually desired point of sale terminal 14 is presented, or all terminals on the list have been processed. In particular, as indicated at steps 130 and 132, the user retrieves additional point of sale terminals on the list, until the desired point of sale terminal is presented (and selected at step 128). However, when the entire list has been processed, and there are no more to process, processing advances to step 134, wherein central processing facility 16 prompts the user of communications device 12 to enter the unique identifier associated with point of sale terminal 14 in a conventional manner.

With reference again to FIG. 9a, once a communications link has been established between central processing facility 16 and point of sale terminal 14 and the device 12 and terminal 14 are electronically associated by central processing facility 16, processing advances to step 114, wherein data indicative of the sale being transacted is transmitted to the central processing facility via a communications link 26, and accounted for in an account corresponding to the device, as described previously. Processing then advances to step 116 where, as before, a confirmation signal is sent from the processing facility to the point of sale terminal 14. Additionally, a confirmation signal is also sent via communications link 24 to the communications device 12 or, alternatively, the point of sale terminal 14 could transmit a confirmation signal via an optional link 28, which link 28 could be established on a different line, a different frequency, or subsequent to termination of link 24. Finally, as indicated at step 118, the communication links are terminated or, at a minimum, the association made by central processing facility 16 between device 12 and 14 is terminated.

Figure 10:
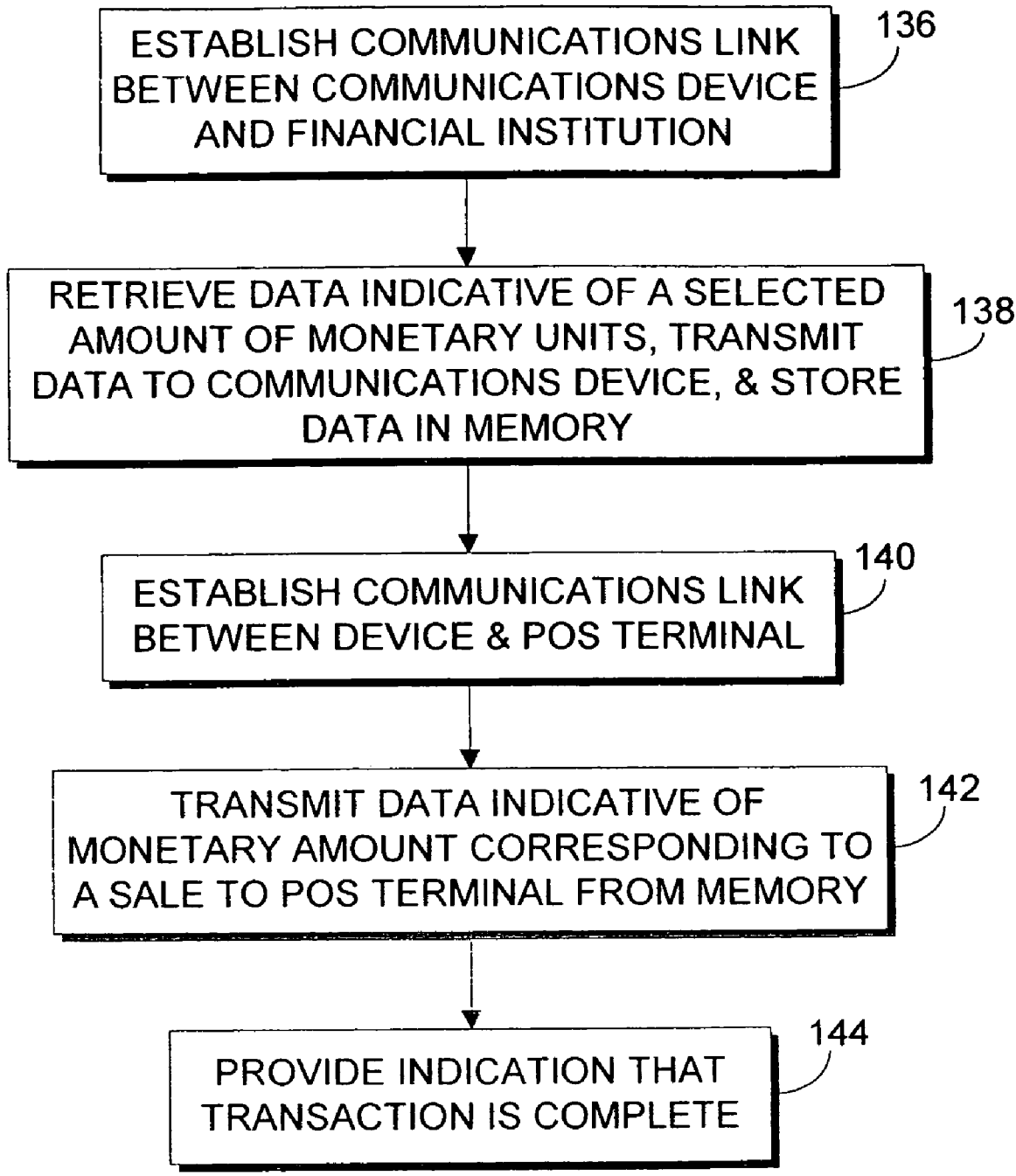
FIG. 10 is a flow diagram illustrating method steps of yet another embodiment of the present invention.

With reference now to FIG. 10 and FIG. 3, use of a "cash-like" embodiment of the invention is illustrated and described.

As indicated at step 136 of FIG. 10, a wireless communications link 32 is established between communications device 12 and central processing facility 16. Then, utilizing key pad input 42 or input 44, or microphone 40 where voice recognition technology is provided, the user of communication device 12 controls processor 78 of central processing facility 16 to retrieve a selected number of monetary units from an account associated with communication device 12, and transmit those units via wireless communications link 32 to communications device 12. That data indicative of monetary units is stored in memory 36 of communications device 12, all as indicated in step 138 of FIG. 9. Then, in the embodiment of FIGS. 3 and 10, the communication link between device 12 and facility 16, which as stated may be a financial institution or at least linked to a financial institution, may be terminated. Subsequently, it is desired to transact a sale at point of sale terminal 14, a wireless communications link 30 is established between communications device 12 and point of sale terminal 14, as illustrated at step 140 of FIG. 10.

As indicated at step 142, the user then operates communications device 12 to cause data indicative of a monetary amount corresponding to a sale to be made at the point of sale terminal to be transmitted from memory 36 to processor 56 point of sale terminal, whereupon processor 56 stores the data in memory 62 or, alternatively, transmits it onto its own associated central processing facility. Once point of sale terminal 14 has confirmed that it has received data to satisfy the sales transaction, an indication that the transaction is complete is provided, as indicated at step 144. The indication that the transmission is complete may be a conventional indication, such as the printing of a receipt, or may be an electronic indication, such as the transmittal of a confirmation signal from point of sale terminal 14 to communications device 12.

Figure 11:
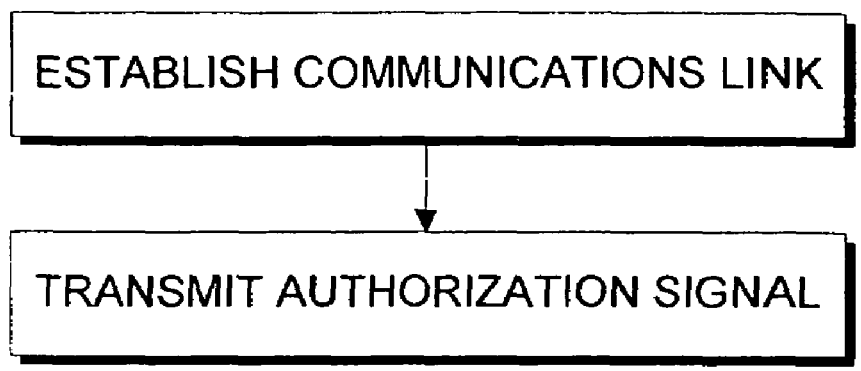
FIG. 11 is a flow diagram illustrating method steps of yet another embodiment of the present invention.

With reference now to FIG. 11, it will be understood and appreciated that, as illustrated, communications device 12 can be utilized to establish a communications channel link with a point of sale terminal, or with a facility connected to a point of sale terminal, then, once all connections are made as heretofore described, communications device 12 may be used to transmit an authorization signal, such as by pressing an appropriate key on the keypad, or by voice command, for authorizing the sale. In other words, user entries involve first establishing the necessary communications, and then making an entry for authorizing the actual sale. As described, the "authorization" entry may be made after the user of communications device 12 has an opportunity to see the "sales price", as indicated at the point of sale terminal, or as provided by an operator at the terminal, or after having viewed or heard data transmitted to the communications device 12 indicative of the sales price associated with the sale being made. Also, when the point of sale terminal 14 at which a transaction is to be made is to operated by an operator (such as in the case of a self-serve gas pump), device 12 first "activates" the terminal 14.

Figure 13:
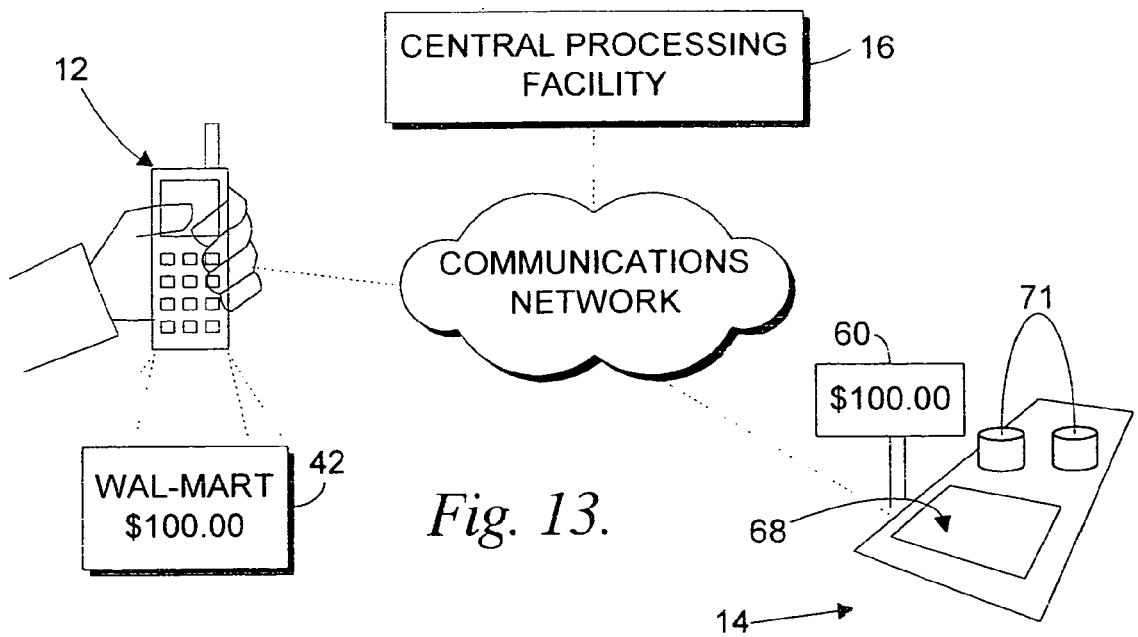
FIG. 13 is an exemplary schematic rendering of said system.

FIG. 13 is an exemplary, schematic view of system 10, wherein a user is holding the hand-held communications device 12, in this case a cellular telephone, and is processing a sales transaction at a point of sale terminal 14. In this instance, the point of sale terminal 14 has a counter with a scanner 68, such as a bar code scanner, for scanning bar codes on product 71. The display 60 is illustrated as showing a sales price of "One Hundred Dollars". As illustrated, the display 42 (shown enlarged) of communications device 12 indicates that a sales price of One Hundred Dollars is associated with the sale being made at the point of sale terminal 14, in this instance associated with the merchant "Wal-Mart". As will be understood and appreciated, the user of communications device 12 may have initially established a communications link with the point of sale terminal or central processing facility, and then must subsequently utilize the device to transmit an authorization code for authorizing the transaction or, alternatively, the act of establishing the communications link may itself be indicative of acceptance or authorization of the sale being made.

In each of the foregoing embodiments, communication device 12 is a portable, wireless communication device. Transmission of data utilizing the wireless communication device may be accomplished in one of many conventional fashions. For example, as described, data may be encoded with an encoder/decoder 48 and transmitted via DTMF signals by the transceiver 50. Alternatively, communications device 12 may be operable to communicate via an Internet protocol, such that it can connect to the Internet, thereby utilizing an Internet connection for transmission of data. In this regard, it should be understood that in the foregoing described embodiments of the present invention, the wireless, hand held communications device 12 has the capability of wirelessly communicating with point of sale terminal and/or a central processing facility via a wireless communications link. While it is preferred that the wireless communications link utilized is at 900 MHz or greater, it should be understood that other frequencies may be employed, and that data may be transmitted in accordance with the invention in one of a variety of different formats, including a variety of encrypted formats, encoded formats, and/or utilizing other protocols such as Internet protocol.

Additionally, system 10 of the present invention permits a number of different security measures to be employed. For example, in addition to encoding and/or otherwise encrypting data to be transmitted within system 10, other safeguards may be employed. For example, before completing a transaction at point of sale terminal 14 utilizing communications 12, system 10 may require the user of communications device 12 to enter a code, such a PIN, utilizing a keypad or, where voice recognition technology is provided, utilizing voice commands entered through microphone 40. Additionally, or alternatively, voice recognition itself could be utilized as a security measure. In this regard, and particularly in the embodiments of FIGS. 1/8 and 2/9, system 10 may require the user to verbally input, via microphone 40, a password, the voice characteristics of which will have been previously stored in the data base memory 86 of the central processing facility. In other words, the central processing facility can then perform a comparison of the voice command with that which was stored in memory, to provide a confirmation that the user of device 12 is an authorized user. As will be understood and appreciated, a plurality of users of device 12, such as members of a family, have voice commands on record, such that more than one user can utilize the device 12.

As still another security measure provided by system 10, a visual image of an authorized user of communications device 12 may be stored by a central processing facility in data base memory 86. Then, upon a link between the communications device 12 and the point of sale terminal 14 being established, either directly or via the central processing facility 16, processor 78 of central processing facility may retrieve the image(s) from data base memory 86 and transmit it to point of sale terminal 14 for display on display screen 60 thereof. In other words, in those instances where point of sale terminal 14 is one which an operator operates the terminal, the operator may provide a visual comparison between the image on the screen 60 and the user of device 12.

Additionally, the user may be required to sign a printed receipt output by the point of sale terminal. As yet an additional security measure, the signature of the authorized user of communications device 12 may be stored in data base memory 86, and transmitted to point of sale terminal 14 for display on display 60 (or for printing by printer 58), so that an operator of point of sale terminal 14 may make a visual comparison of the signatures. Additionally, safeguards can be provided to ensure the association of only one terminal 14 with one device 12 at a time. It will be understood and appreciated that the foregoing security measures may or may not be used and, when used, may be used independently or in combination with each other.

The present invention provides a unique device, system, and method for performing financial transactions, and particularly sales transactions at appropriately equipped or linked point of sale or transaction terminals. In this regard, the present invention particularly provides subscribers of cellular telephones or pagers, or personal hand held computers equipped with wireless communications capabilities, to utilize those devices for making transactions.

Figure 12:
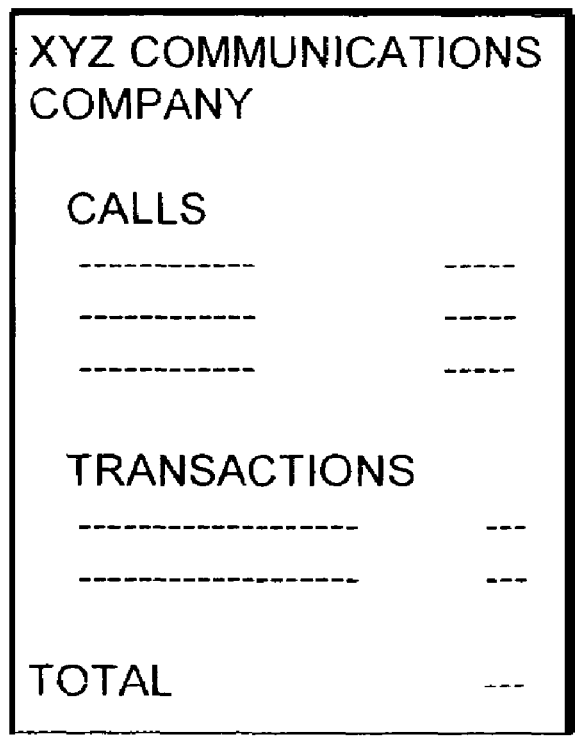
FIG. 12 is a representative example of a consolidated invoice as is created in accordance with the principles of the present invention.

Another advantage of the present invention is that it provides consolidated billing, invoicing, and record keeping. In this regard, and as illustrated in FIG. 11, when communications device 12, for example, is a cellular telephone, accumulated data indicative of call usage are stored in an appropriate account at central processing facility. Then, based upon a periodic billing or record keeping cycle, an invoice, either digital or paper, may produced, as illustrated in FIG. 12, bearing the accumulated call data and the accumulated transaction data. In this regard, it should be understood that in one embodiment the document illustrated in FIG. 12 is an invoice, which requires payment by the user for call usage and transactions made. Alternatively, the document illustrated in FIG. 12 may simply be a statement, setting forth the calls and transactions that have been accounted to a selected account, such as a debit or credit account. Alternatively, the document illustrated in FIG. 12 can be a combination of an invoice and statement, such that (for example) accumulated call data is invoiced for payment by the customer, while accumulated transactions have already been accounted to a selected account, and thus are illustrated for record keeping purposes.

The present invention opens a door to a wide variety of user options, not heretofore possible. For example, system 10 of the present invention also permits the user of communications device 12 to associate a plurality of accounts with communications device 12. Thus, for instance, when making a sales transaction utilizing communications device 12, the user has the option of selecting the account to which the transaction should be accounted. For example, the user of communications device 12 may associate the device with a credit account also a debit or bank account. Then, when making a purchase, the user may select whether he or she wishes for the purchase to be credited to the credit account, or debited from the debit account. This is in complete contrast to conventional debit or credit cards, which are one or the other. Alternatively, the user may select to have the purchase invoiced for subsequent billing. As will be appreciated, the user may even select multiple credit accounts or debit accounts for selection.

In view of the foregoing, operation of this selection process will be clearly understood. In summary, a plurality of accounts of the user of communications device 12 may be associated with the device 12 in data base memory 86. Then, utilizing an input of communications device 12, such as the keypad input 44, or input 46, or when voice recognition technology is provided, utilizing microphone 40, the user may select that account manner to which he or she wishes the transaction to be processed. In a preferred embodiment, one of the plurality of accounts is "preferred", and is utilized as a default. In other words, all transactions will be accounted to that account, whether it be a credit account, a debit account, or simply an account for utilizing an input of communications device 12. However, the user may opt to change the account to which a transaction is to be accounted on a case by case basis. Additionally, utilizing system setup capabilities provided with the software of system 10, the user may alter the "default" account utilizing communications device 12, when desired.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A device comprising:
a processor;
a memory;
an input;
a display;
a microphone;
a speaker;
a first transmitter for transmitting voice and data via a first radio frequency, wherein said first radio frequency comprises a cellular frequency;
a second transmitter, wherein said second transmitter is a short range transmitter for transmitting at least data via a second radio frequency;
a third transmitter comprised of a transponder; and
a portable housing that contains said processor, said memory, said input, said display, said microphone, said speaker, said first transmitter, said second transmitter, and said third transmitter, wherein said device comprises a portable cellular telephone and wherein, when said device is used to make a remote purchase transaction at a first point of sale terminal that is located remotely from said device, said first transmitter transmits identifying information, for use in processing said remote purchase transaction, at said cellular frequency to at least one of said first point of sale terminal and a processor associated with said first point of sale terminal and wherein, when said device is used to make a local purchase transaction at a second point of sale terminal that is located in physical proximity to said device and said second transmitter of said device is within a transmission range of said second point of sale terminal, said second transmitter wirelessly transmits identifying data, for use in making said local purchase transaction at said second point of sale terminal, via a short range wireless transmission at said second frequency to said second point of sale terminal and wherein, when said device is used to make a local buying transaction at a third point of sale terminal that is located in close physical proximity to said device and said device is in the presence of a field generated by said third point of sale terminal, said transponder, in response to the presence of the generated field, is stimulated and automatically transmits an identifier to said third point of sale terminal for use in making said buying transaction at said third point of sale terminal.

2. The device as set forth in claim 1, wherein said device further comprises a portable computer.

3. The device as set forth in claim 2, wherein said portable computer is a laptop or notebook computer.

4. The device as set forth in claim 2, wherein said portable computer is a personal digital assistant (PDA).

5. The device as set forth in claim 1, wherein said device further comprises a pager.

6. The device as set forth in claim 1, wherein said identifier is transmitted to said point of sale terminal via said short range wireless transmission is transmitted via a local wireless area network.

7. The device as set forth in claim 1, wherein said input is used for dialing telephone numbers and for entering a personal identification number (PIN), wherein said PIN must be entered into said device to complete said transaction.

8. The device as set forth in claim 1, wherein a user of said device must be identified by input of said user's voice into said device before said purchase transaction at said point of sale terminal is completed.

9. The device as set forth in claim 1, wherein said second point of sale terminal comprises a television.

10. The device as set forth in claim 1, wherein said second point of sale terminal comprises a vending machine.

11. The device as set forth in claim 1, wherein said second point of sale terminal comprises a fast-food drive through terminal.

12. The device as set forth in claim 1, wherein said second point of sale terminal comprises a gas pump.

13. The device as set forth in claim 1, wherein said second point of sale terminal comprises a check-out station at a retail store.

14. The device as set forth in claim 1, wherein said second point of sale terminal comprises a restaurant payment terminal.

15. The device as set forth in claim 1, wherein an electronic receipt indicative of at least one of said remote purchase transaction and said local purchase transaction is transmitted to said device.

16. The device as set forth in claim 15, wherein said electronic receipt is displayed on said display.

17. The device as set forth in claim 1, wherein said device does not have a smart card engine chip.

18. The device as set forth in claim 1 wherein said transmitted identifying information is transmitted via a short message service.

19. The device as set forth in claim 1 wherein said device is operated, by a purchaser, in physical proximity to said second point of sale terminal during said local purchase transaction and wherein goods or services purchased during said local purchase transaction are delivered to said purchaser at a location corresponding to said point of sale terminal and at a time of said local purchase transaction.

20. The device as set forth in claim 1, wherein said second transmitter transmits according to a Bluetooth protocol.

21. The device as set forth in claim 1, wherein said first transmitter that transmits on said cellular frequency operates according to a standard used in at least one of the following wireless communications systems: CDMA, TDMA, iDEN, CDPD, PCS, PDC and WAP.

22. The device as set forth in claim 1, wherein said device further comprises:

functionality to communicate information via a short-message-service (SMS) signal regarding said remote purchase transaction, and wherein said device wirelessly receives voice prompts for use in selecting said second point of sale terminal, and wherein said device receives an input indicating a selection of said second point of sale terminal, and wherein said device receives a first confirmation signal from said first point of sale terminal when said remote purchase transaction is complete and, in response to said receipt of said first confirmation signal, said device audibly outputs a tone and visually displays an indication confirming completion of said remote purchase transaction and wherein said device receives a second confirmation signal from said second point of sale terminal when said local purchase transaction is complete and, in response to said receipt of said second confirmation signal, said device provides an audible output and a visual display that provides an indication confirming completion of said local purchase transaction, and wherein said device receives a third confirmation signal from said third point of sale terminal when said local buying transaction is complete and, in response to said receipt of said third confirmation signal, said device audibly outputs a sound and provides a visual presentation confirming completion of said local buying transaction.

23. The device as set forth in claim 1, wherein said third point of sale terminal comprises a fast-food drive through terminal such that said local buying transaction occurs only when said device is in the presence of said field generated by said fast-food drive through terminal.

24. A device comprising:

a processor;
a memory;
an input;
a display;
a microphone;
a speaker;
a first transmitter for transmitting voice and data via a first radio frequency, wherein said first radio frequency comprises a cellular frequency;
a second transmitter, wherein said second transmitter is comprised of a transponder for wirelessly transmitting data a short range via a second radio frequency; and
a portable housing for housing said processor, said memory, said input, said display, said microphone, said speaker, said first transmitter, and said second transmitter, wherein said device comprises a portable cellular telephone and wherein, when said device is used to make a remote purchase transaction at a remote point of sale terminal that is located remotely from said device, said first transmitter wirelessly transmits identifying information, for use in processing said remote purchase transaction, at said cellular frequency to at least one of said first point of sale terminal and a processor associated with said first point of sale terminal and wherein, when said device is used to make a local purchase transaction at a second point of sale terminal that is located in physical proximity to said device and said device is within a field generated at said second point of sale terminal, said transponder, in response to the presence of the generated field, is stimulated and wirelessly transmits identifying data, for use in processing said local purchase transaction, via a short range wireless transmission at said second frequency to said second point of sale terminal.

25. The device as set forth in claim 24, wherein said device further comprises a portable computer.

26. The device as set forth in claim 25, wherein said portable computer is a laptop or notebook computer.

27. The device as set forth in claim 25, wherein said portable computer is a personal digital assistant (PDA).

28. The device as set forth in claim 24, wherein said device further comprises a pager.

29. The device as set forth in claim 24, wherein said identifying information for use in processing said local purchase transaction that is transmitted via said short range wireless transmission to said point of sale terminal via a local wireless area network.

30. The device as set forth in claim 24, wherein said input is for dialing telephone numbers and entering a personal identification number (PIN), wherein said PIN must be entered into said device to complete said transaction.

31. The device as set forth in claim 24, wherein a user of said device must be identified by input of said user's voice into said device before said purchase transaction at said point of sale terminal is completed.

32. The device as set forth in claim 24, wherein said second point of sale terminal comprises a television.

33. The device as set forth in claim 24, wherein said second point of sale terminal comprises a vending machine.

34. The device as set forth in claim 24, wherein said second point of sale terminal comprises a fast-food drive through terminal.

35. The device as set forth in claim 24, wherein said second point of sale terminal comprises a gas pump.

36. The device as set forth in claim 24, wherein said second point of sale terminal comprises a check-out station at a retail store.

37. The device as set forth in claim 24, wherein said second point of sale terminal comprises a restaurant payment terminal.

38. The device as set forth in claim 24, wherein an electronic receipt indicative of at least one of said remote purchase transaction and said local purchase transaction is transmitted to said device.

39. The device as set forth in claim 38, wherein said electronic receipt is displayed on said display.

40. The device as set forth in claim 24, wherein said device does not have a smart card engine chip.

41. The device as set forth in claim 24 wherein said transmitted data indicative of identifying information that is transmitted to said first point of sale terminal for use in said remote purchase transaction is transmitted via a short message service.

42. The device as set forth in claim 24 wherein said device is operated, by a purchaser, in physical proximity to said second point of sale terminal during said local purchase transaction and wherein goods or services purchased during said local purchase transaction are delivered to said purchaser at a location corresponding to said second point of sale terminal and at a time of said local purchase transaction.

43. The device as set forth in claim 24, wherein said identifying information and said identifying data comprise common subject matter.

44. The device as set forth in claim 43, wherein said common subject matter comprises an identifier that identifies at least one of said cellular telephone and a user of said cellular telephone.

45. The device as set forth in claim 43, wherein said identifier comprises a telephone number associated with said cellular telephone.

46. The device as set forth in claim 43, wherein said identifier comprises a unique code.

47. The device as set forth in claim 43, wherein said identifier identifies a credit account.

48. The device as set forth in claim 43, wherein said identifier identifies a debit account.

49. The device as set forth in claim 43, wherein said identifier identifies a subscription account associated with said cellular telephone.

50. The device as set forth in claim 24, wherein said identifying information and said identifying data comprise different subject matter.

51. The device as set forth in claim 50, wherein a one of said identifying information and said identifying data identifies a financial account and the other of said identifying information and said identifying data comprises a unique code that uniquely identifies at least one of said cellular telephone and a user thereof.

52. The device as set forth in claim 51, wherein said unique code comprises a telephone number.

53. The device as set forth in claim 24, wherein said second transmitter transmits according to a Bluetooth protocol.

54. The device as set forth in claim 24, wherein said first transmitter that transmits on said cellular frequency operates according to a standard used in at least one of the following wireless communications systems: CDMA, TDMA, iDEN, CDPD, PCS, PDC, and WAP.

55. A device comprising:
 a processor;
 a memory;
 an input;
 a display;
 a microphone;
 a speaker;
 a first transmitter for transmitting voice and data via a first radio frequency, wherein said first radio frequency comprises a cellular frequency;
 a second transmitter, wherein said second transmitter is a short range transmitter for transmitting at least data via a second radio frequency;
 a third transmitter comprised of a transponder; and
 a portable housing for nonremovably containing, in ordinary use of said device, said processor, said memory, said input, said display, said microphone, said speaker, said first transmitter, said second transmitter, and said third transmitter, wherein said device is a portable cellular telephone and wherein, when said device is used to make a remote purchase transaction at a first point of sale terminal that is located remotely from said device, said first transmitter wirelessly transmits, via said first frequency identifying information, for use in processing said remote purchase transaction, to at least one of said first point of sale terminal and a processor associated with said first point of sale terminal and wherein, when said device is used to make a local purchase transaction at a second point of sale terminal that is located in physical proximity to said device and is within a transmission range of said second point of sale terminal, said second transmitter wirelessly transmits identifying data for use in processing said local purchase transaction, at said second frequency via a short range wireless transmission to said second point of sale terminal for use in processing said local purchase transaction, and wherein, when said device is used to make a local buying transaction at a third point of sale terminal that is located in close physical proximity to said device and said device is in the presence of a field generated by said third point of sale terminal, said transponder, in response to the presence of the generated field, is stimulated and automatically transmits an identifier to said third point of sale terminal for use in making said buying transaction at said third point of sale terminal, wherein said cellular telephone has an associated subscriber account and an amount corresponding to at least one purchase transaction made with said cellular telephone during a defined period of time is presented on a statement corresponding to said subscriber account and said defined period of time.

56. The device as set forth in claim 55 wherein said device is operated, by a purchaser, in physical proximity to said second point of sale terminal during said local purchase transaction and wherein goods or services purchased during said local purchase transaction are delivered to said purchaser at a location corresponding to said second point of sale terminal and at a time of said local purchase transaction.

57. A device comprising:
a processor;
a memory;
an input;
a display;
a microphone;
a speaker;
a first transmitter for transmitting voice received by said microphone and data via a first radio frequency, wherein said first radio frequency comprises a cellular frequency;
a second transmitter, wherein said second transmitter is comprised of a transponder for transmitting at least data via a second radio frequency; and
a portable housing for nonremovably containing, in ordinary use of said device, said processor, said memory, said input, said display, said microphone, said speaker, said first transmitter and said second transmitter, wherein said device is a portable cellular telephone and wherein, when said device is used to make a remote purchase transaction at a first point of sale terminal that is located remotely from said device, said first transmitter wirelessly transmits, via said first frequency, identifying information, for use in processing said remote purchase transaction, to at least one of said first point of sale terminal and a processor associated with said first point of sale terminal and wherein, when said device is used to make a local purchase transaction at a second point of sale terminal that is located in physical proximity to said device and said transponder is within a field generated at said second point of sale terminal, said transponder is stimulated and, in response to the presence of the generated field, wirelessly transmits identifying information, for use in processing said local purchase transaction, at said second frequency via a short range wireless transmission to said second point of sale terminal for use in processing said local purchase transaction, wherein said cellular telephone has an associated subscriber account and an amount corresponding to at least one purchase transaction made with said cellular telephone during a defined period of time is presented on a statement corresponding to said subscriber account and said defined period of time.

58. The device as set forth in claim 57 wherein said device is operated, by a purchaser, in physical proximity to said second point of sale terminal during said local purchase transaction and wherein goods or services purchased during said local purchase transaction are delivered to said purchaser at a location corresponding to said point of sale terminal and at a time of said local purchase transaction.

* * * * *